(12) United States Patent
Onodera

(10) Patent No.: US 8,423,354 B2
(45) Date of Patent: Apr. 16, 2013

(54) SPEECH RECOGNITION DICTIONARY CREATING SUPPORT DEVICE, COMPUTER READABLE MEDIUM STORING PROCESSING PROGRAM, AND PROCESSING METHOD

(75) Inventor: Sachiko Onodera, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/926,281

(22) Filed: Nov. 5, 2010

(65) Prior Publication Data

US 2011/0119052 A1 May 19, 2011

Related U.S. Application Data

(63) Continuation of application No. PCT/JP2008/058615, filed on May 9, 2008.

(51) Int. Cl.
*G06F 17/21* (2006.01)
(52) U.S. Cl.
USPC ............. 704/10; 704/243; 704/244; 704/245; 704/251
(58) Field of Classification Search ............ 704/10, 704/243–245
See application file for complete search history.

(56) References Cited

U.S. PATENT DOCUMENTS

| | | | | |
|---|---|---|---|---|
| 5,806,030 | A * | 9/1998 | Junqua | 704/245 |
| 5,933,805 | A * | 8/1999 | Boss et al. | 704/249 |
| 6,078,885 | A * | 6/2000 | Beutnagel | 704/258 |
| 6,092,044 | A * | 7/2000 | Baker et al. | 704/254 |
| 6,192,333 | B1 * | 2/2001 | Pentheroudakis | 704/10 |
| 7,120,575 | B2 * | 10/2006 | Haase et al. | 704/207 |
| 7,228,276 | B2 * | 6/2007 | Omote et al. | 704/243 |
| 7,280,963 | B1 * | 10/2007 | Beaufays et al. | 704/236 |
| 7,337,116 | B2 * | 2/2008 | Charlesworth et al. | 704/254 |
| 7,472,061 | B1 * | 12/2008 | Alewine et al. | 704/243 |
| 7,702,509 | B2 * | 4/2010 | Bellegarda | 704/258 |

(Continued)

FOREIGN PATENT DOCUMENTS

| | | |
|---|---|---|
| JP | 63-165900 | 7/1988 |
| JP | 07-020889 | 1/1995 |

(Continued)

OTHER PUBLICATIONS

Sloboda et al. "Dictionary Learning for Spontaneous Speech Recognition" 1996.*

(Continued)

*Primary Examiner* — Greg Borsetti
(74) *Attorney, Agent, or Firm* — Staas & Halsey LLP

(57) ABSTRACT

A device extracts prosodic information including a power value from a speech data and an utterance section including a period with a power value equal to or larger than a threshold, from the speech data, divides the utterance section into each section in which a power value equal to or larger than another threshold, acquires phoneme sequence data for each divided speech data by phoneme recognition, generates clusters which is a set of the classified phoneme sequence data by clustering, calculates an evaluation value for each cluster, selects clusters for which the evaluation value is equal to or larger than a given value as candidate clusters, determines one of the phoneme sequence data from the phoneme sequence data constituting the cluster for each candidate cluster to be a representative phoneme sequence, and selects the divided speech data corresponding to the representative phoneme sequence as listening target speech data.

16 Claims, 23 Drawing Sheets

U.S. PATENT DOCUMENTS

| | | | |
|---|---|---|---|
| 7,957,969 B2* | 6/2011 | Alewine et al. | 704/254 |
| 2002/0002454 A1* | 1/2002 | Bangalore et al. | 704/9 |
| 2002/0010575 A1* | 1/2002 | Haase et al. | 704/205 |
| 2002/0087313 A1* | 7/2002 | Lee et al. | 704/254 |
| 2002/0120447 A1* | 8/2002 | Charlesworth et al. | 704/254 |
| 2003/0120493 A1* | 6/2003 | Gupta | 704/270.1 |
| 2003/0212548 A1* | 11/2003 | Petty | 704/201 |
| 2003/0216912 A1* | 11/2003 | Chino | 704/231 |
| 2003/0233251 A1* | 12/2003 | Haskell et al. | 705/2 |
| 2004/0030544 A1* | 2/2004 | Ramabadran | 704/205 |
| 2004/0030552 A1* | 2/2004 | Omote et al. | 704/245 |
| 2004/0249639 A1* | 12/2004 | Kammerer | 704/249 |
| 2005/0159949 A1* | 7/2005 | Yu et al. | 704/235 |
| 2005/0187769 A1* | 8/2005 | Hwang et al. | 704/240 |
| 2007/0112554 A1* | 5/2007 | Goradia | 704/4 |
| 2007/0118355 A1* | 5/2007 | Kato et al. | 704/9 |
| 2007/0162281 A1* | 7/2007 | Saitoh et al. | 704/251 |
| 2007/0250320 A1* | 10/2007 | Chengalvarayan | 704/254 |
| 2008/0120093 A1* | 5/2008 | Izumida et al. | 704/10 |
| 2008/0162137 A1* | 7/2008 | Saitoh et al. | 704/251 |
| 2008/0249773 A1* | 10/2008 | Bejar et al. | 704/243 |
| 2008/0270129 A1* | 10/2008 | Colibro et al. | 704/236 |
| 2009/0055185 A1* | 2/2009 | Nakade et al. | 704/257 |
| 2010/0023329 A1* | 1/2010 | Onishi | 704/244 |
| 2010/0057461 A1* | 3/2010 | Neubacher et al. | 704/243 |

FOREIGN PATENT DOCUMENTS

| | | |
|---|---|---|
| JP | 2002-116788 | 4/2002 |
| JP | 2002-358095 | 12/2002 |
| JP | 2003-241788 | 8/2003 |
| JP | 2004-117662 | 4/2004 |
| JP | 2007-213005 | 8/2007 |
| JP | 2007-293600 | 11/2007 |

OTHER PUBLICATIONS

Niemann et al. "Using Prosodic Cues in Spoken Dialog Systems" 1998.*

Li et al. "Robust Endpoint Detection and Energy Normalization for Real-Time Speech and Speaker Recognition" 2002.*

International Search Report for PCT/JP2008/058615, mailed Aug. 12, 2008.

English Translation of the International Preliminary Report on Patentability issued Dec. 13, 2010 in corresponding International Patent Application PCT/JP2008/058615.

* cited by examiner

| split_id | CLUSTER ID | SCORE | SELECTION RESULTS |
|---|---|---|---|
| 20070921001_1_1 | id1 | 0.72 | ○ |
| 20070921001_1_2 | — | | |
| ... | ... | ... | ... |
| 20070921002_1_1-1 | id3 | 0.21 | × |
| 20070921002_1_1-2 | id10 | 0.68 | ○ |
| ... | ... | ... | ... |

○ = SELECTED AS CANDIDATE CLUSTER
× = NOT SELECTED AS CANDIDATE CLUSTER

Figure 14

CLUSTER TABLE
| split_id | CLUSTER ID | SCORE | SELECTION RESULTS |
|---|---|---|---|
| 20070921001_1_1 | id1 | 0.72 | ○ |
| 20070921001_1_2 | — | | |
| ... | ... | ... | ... |
| 20070921002_1_1-1 | id3 | 0.21 | × |
| 20070921002_1_1-2 | id10 | 0.68 | ○ |
| ... | ... | ... | ... |
104
Figure 15A
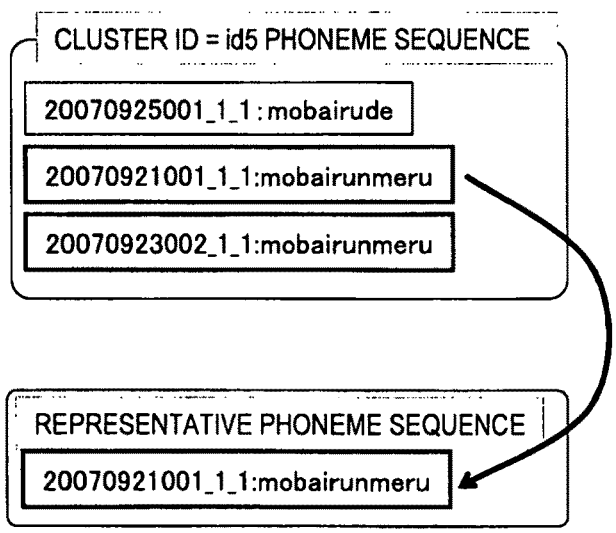
Figure 15B
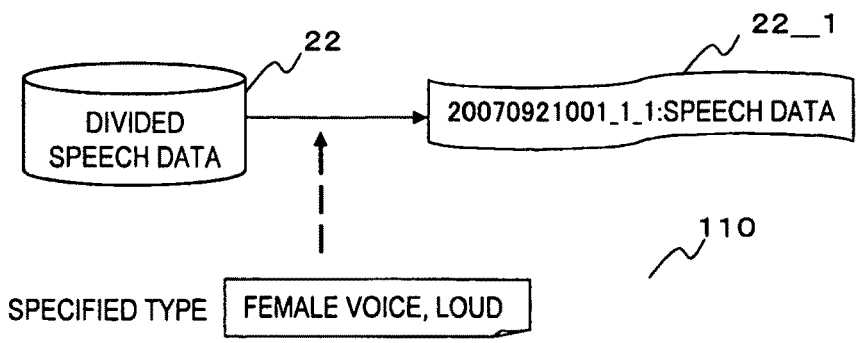
Figure 15C

SPEECH RECOGNITION DICTIONARY CREATING SUPPORT DEVICE, COMPUTER READABLE MEDIUM STORING PROCESSING PROGRAM, AND PROCESSING METHOD

This is an continuation application which claims the benefit of PCT international application number PCT/JP2008/058615, filed on May 9, 2008.

FIELD

The present invention relates to a device that support creating a speech recognition dictionary and a processing method that support creating a speech recognition dictionary. More specifically, the present invention relates to a method for extracting a speech data of unknown word to be a candidate for a keyword registered in the speech recognition dictionary from the whole speech data.

BACKGROUND

In connection with call center operations, there is a demand to grasp operational contents such as the types of clients' inquiries, the contents of questions, and talk time to utilize the determined contents for operational analysis and planning. Here, the talk time means amount of time a call center agent spends with a caller during a transaction. Thus, in many call centers, telephone operators record the contents of each of their responses so that the response records can be analyzed later. However, in small-scale call centers, responses are not recorded or response records are available but contain only a small amount of information. Therefore, dialogue between clients and telephone operators need to be recorded so that speech dialog data can be analyzed.

However, it is a high cost and difficult to listen to all of the speech data from the beginning in order to grasp the response contents from the speech dialogue data. Thus, in order to determine sections enough to understand the content from speech data mainly composed of spoken language such as the dialogue between clients and telephone operators, keywords extracted based on speech recognition are used.

However, in the speech recognition, an unknown keyword may be misrecognized as a known word or fail to be recognized and remain undetected. Thus, a keyword dictionary (keyword list) needs to be maintained and managed. In particular, if speech data which records dialogue between clients and operators in a call center is to be dealt with, any of technical terms or unique words uttered during the responses is specified as a keyword. Thus, effective speech recognition process cannot be achieved with a general keyword dictionary.

A conventional keyword dictionary creating process involves extracting a keyword from manuals and related documents for the contents of operations in the call center, and adding speech data on the keyword to the keyword dictionary. Alternatively, a maintenance operator actually listens to the speech dialogue data from the beginning, extracts a keyword, and adds the keyword to the keyword dictionary.

Furthermore, a processing technique for extracting an unknown word during speech recognition is known. For example, Patent Document 1 discloses a process of preparing a speech recognition grammar that assumes unknown words to appear, extracting speech characteristic information and a phoneme sequence for a section in which an unknown word is assumed to appear, carrying out clustering based on the speech characteristic information, detecting a representative phoneme sequence in the clustered phoneme sequence as an unknown word, and additionally registering the phoneme sequence in a dictionary. Japanese Patent Laid-Open No. 2002-358095, as Patent Document 1, may disclose a technique related in the invention.

Keywords extracted from related documents by the conventional keyword extracting process may not be used as proper keywords because speech dialogue data to be recognized is spoken language.

On the other hand, if keywords are manually extracted from speech dialogue data by actual listening, listening to all of the speech data requires a long time, disadvantageously resulting in very high operation costs.

Furthermore, in the process disclosed in Patent Document 1, the section in which the unknown word is expected to be uttered is pre-specified based on the speech recognition grammar structure. Thus, the process is difficult to apply to speech data which records dialogues that are difficult to stylize.

As described above, no technique for directly extracting an unknown keyword from speech data has been realized.

SUMMARY

According to an aspect of the invention, a device includes a speech data storage section configured to store speech data, and extracts prosodic information including at least a speech power value from the speech data. Moreover, based on the prosodic information, the device extracts an utterance section in which a period with a power value equal to or larger than a predetermined threshold value lasting a preset time or longer from the speech data. Then, the device divides the utterance section into sections in each of which a power value equal to or larger than a predetermined threshold value continues for a given time or longer and a divided speech data is created.

Then, a device executes phoneme recognition process on the divided speech data to acquire phoneme sequence data for each divided speech data and executes a clustering process on the phoneme sequence data to generate clusters each of which is a set of the classified phoneme sequence data.

Moreover, the device calculates, for each of the clusters, an evaluation value based on prosodic information for the divided speech data corresponding to the phoneme sequence data constituting the cluster. The device, then selects clusters for which the evaluation value is equal to or larger than a given value as candidate clusters. Further, the device determines one of the phoneme sequence data from the phoneme sequence data constituting the cluster for each of the candidate clusters to be a representative phoneme sequence. Then the device selects the divided speech data corresponding to the representative phoneme sequence as listening target speech data.

The selected listening target speech data is an utterance section cut out from the speech data based on the power value and is divided speech data corresponding to a word of a keyword candidate.

There is no need for a maintenance operator to listen to the speech data from the beginning. He or she may only listen to the listening target speech data corresponding to a section in which a word likely to be adopted as a keyword is uttered.

According to the present invention, when the section of the speech data in which the word likely to be selected as a keyword is uttered is specified and the representative speech data in which the word is uttered is extracted as listening target speech data, this process can be executed without the use of any data other than the speech data and in an automated manner.

This eliminates the need for a high-cost operation of listening to the speech data from the beginning to extract the section in which the keyword is uttered. As a result, a keyword dictionary can be efficiently created and maintained.

The object and advantage of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 14 is a diagram illustrating a candidate cluster selecting process;

FIGS. 15A, 15B and 15C are diagrams illustrating a listening target data selecting process;

DESCRIPTION OF EMBODIMENTS

Figure 1:
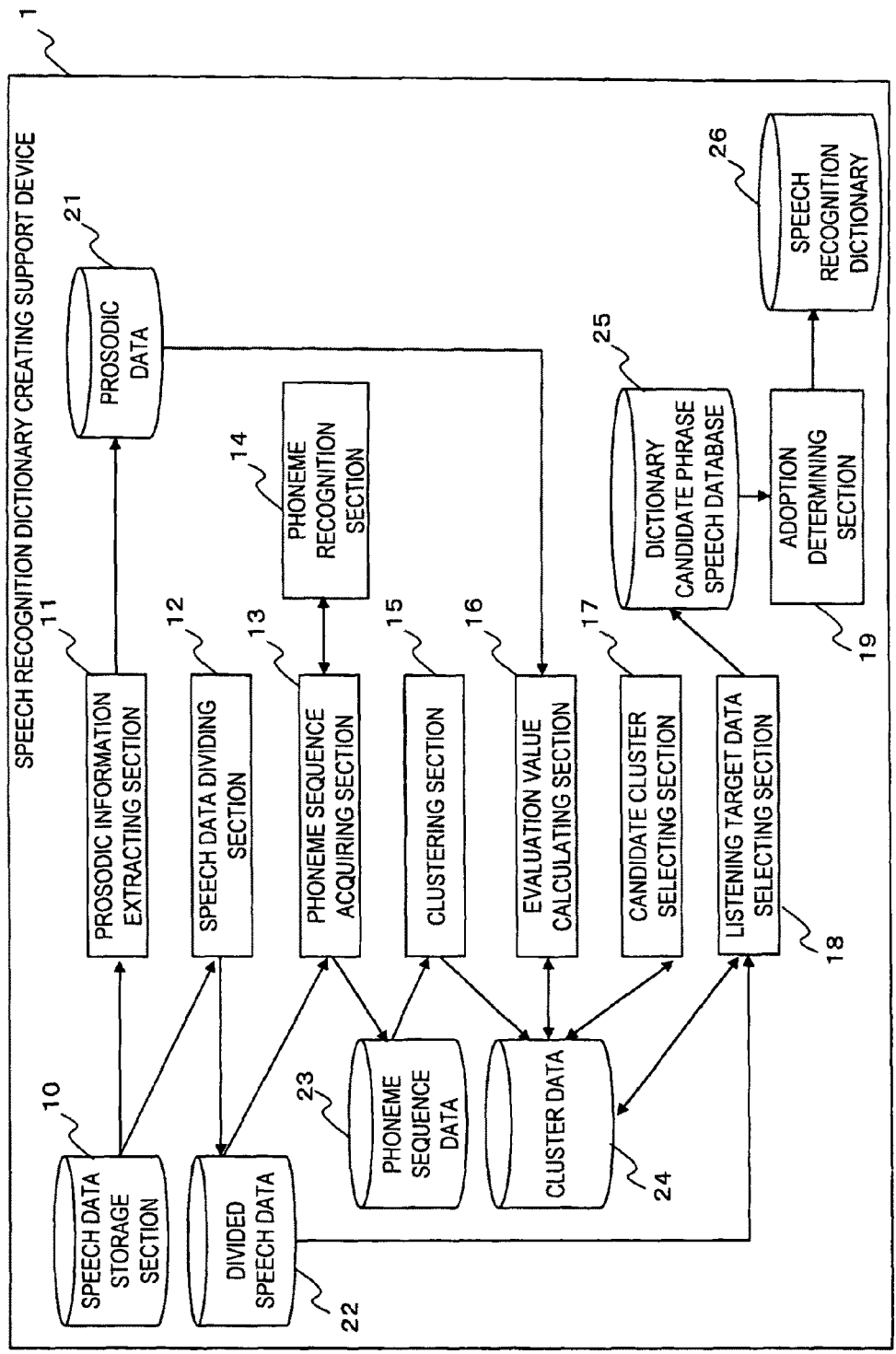
FIG. 1 is a diagram illustrating an example of the configuration of a speech recognition dictionary creating support device according to an embodiment of the present invention.

FIG. 1 is a diagram illustrating an example of the configuration of a speech recognition dictionary creating support device 1 according to an embodiment of the present invention.

The speech recognition dictionary creating support device 1 supports a process of creating and updating a speech recognition dictionary 26 required to recognize a section (partial data) of speech data in which a keyword is uttered. The speech recognition dictionary creating support device 1 includes a speech data storage section 10, a prosodic information extracting section 11, a speech data dividing section 12, a phoneme sequence acquiring section 13, a phoneme recognizing section 14, a clustering section 15, an evaluation value calculating section 16, a candidate cluster selecting section 17, a listening target data selecting section 18, and an adoption determining section 19.

The speech data storage section 10 is configured to store speech data 20 including recorded speeches. The speech data 20 includes, for example, recorded dialogue speeches such as records of telephone responses called in a call center which are mainly spoken language.

The prosodic information extracting section 11 extracts, from speech data 20, prosodic data 21 such as a speech power value or a speech pitch value for every predetermined time.

The speech data dividing section 12 specifies utterance sections of the speech data 20 and sets each of the utterance sections using predetermined separating elements, to generate divided speech data 22.

The phoneme sequence acquiring section 13 generates phoneme sequence data 23 corresponding to the divided speech data 22 based on phonemes in the speech data 20 recognized by the phoneme recognizing section 14.

The phoneme recognizing section 14 recognizes phonemes included in the speech data, using a well-known speech recognition technique.

The clustering section 15 cleans the phoneme sequence data 23 and classifies the cleaned phoneme sequence data 23' using a well-known clustering technique. The clustering section 15 then generates cluster data 24 on the classified clusters.

The evaluation value calculating section 16 uses a predetermined evaluation technique to calculate an evaluation value for each of the clusters in the cluster data 24.

The candidate cluster selecting section 17 selects clusters with high evaluation values from the clusters in the cluster data 24 as cluster candidates.

The listening target data selecting section 18 determines one of the phoneme sequences in the phoneme sequence data 23 constituting the cluster to be a representative phoneme sequence. The listening target data selecting section 18 selects the divided speech data 22 corresponding to the representative phoneme sequence, as listening target data. The listening target data selecting section 18 then accumulates the listening target data in a dictionary candidate phrase speech database 25.

The adoption determining section 19 reproduces the divided speech data 22 accumulated in the dictionary candidate phrase speech database 25. The adoption determining section 19 then determines whether or not to adopt the divided speech data 22 as registration data for the speech recognition dictionary 26. The adoption determining section 19 then registers the divided speech data 22 determined to be adopted, in the speech recognition dictionary 26.

Figure 2:
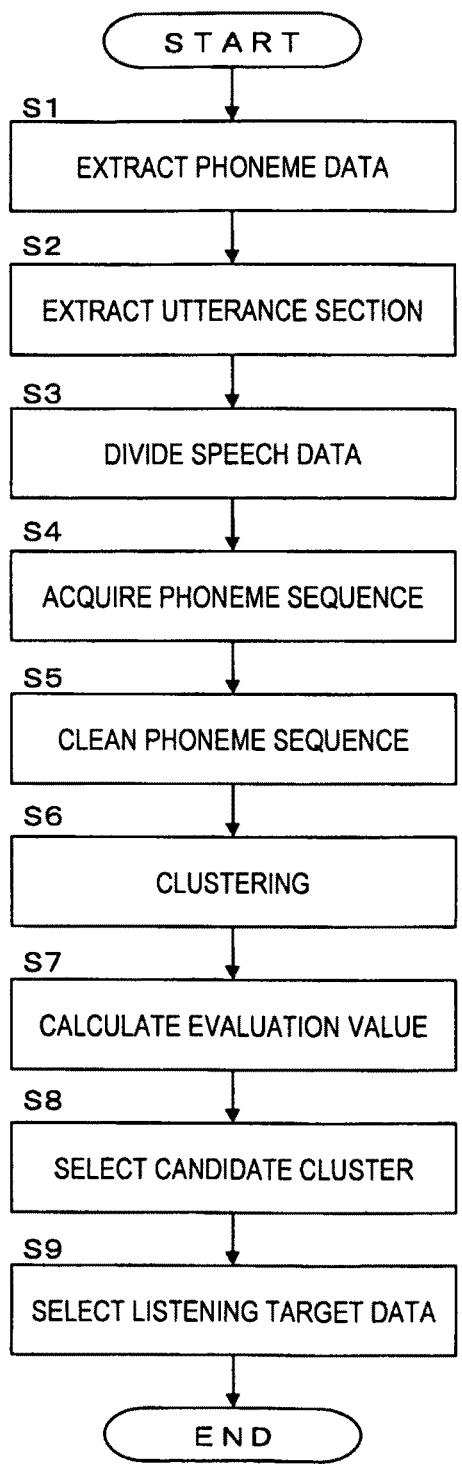
FIG. 2 is a diagram schematically illustrating a process executed by the speech recognition dictionary creating support device.

FIG. 2 is a diagram schematically illustrating a process executed by the speech recognition dictionary creating support device 1.

Step S1: Extraction of Prosodic Data

The prosodic information extracting section 11 calculates a power value and a pitch value at each given time based on the speech data 20 stored in a predetermined storage section and managed via a speech data management table 100. The prosodic information extracting section 11 generates a power value file and a pitch value file.

Figure 3:
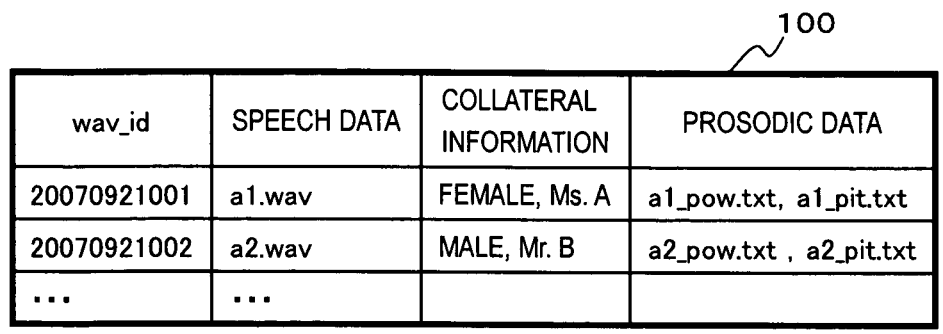
FIG. 3 is a diagram illustrating an example of a speech data management table.

FIG. 3 is a diagram illustrating an example of the speech data management table 100.

The speech data management table 100 contains items including wav_id, speech data, collateral information, and prosodic data. Identification information on the speech data 20 is stored in the wav_id. A file name for the speech data 20 is stored in the speech data. Attribute (sex or name) information on a person who recorded the speech data 20 is stored in the collateral information. File names of a power value file and a pitch value file for the speech data 20 are stored in the prosodic data.

Figure 4A:
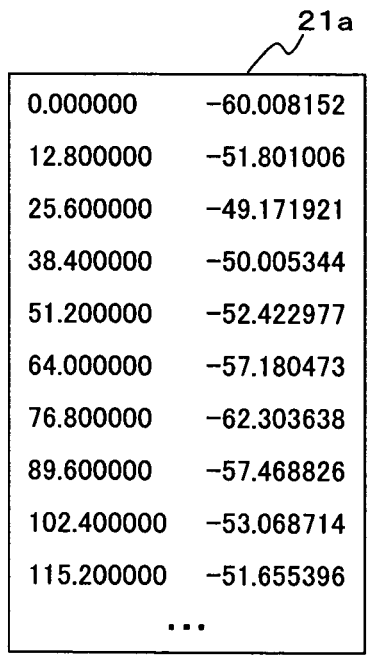
FIGS. 4A and 4B are diagrams illustrating examples of prosodic data.
Figure 4B:
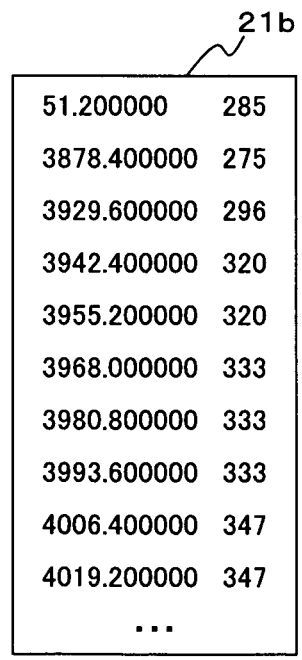

FIGS. 4A and 4B are diagrams illustrating examples of the prosodic data 21. FIG. 4A shows an example of a power value file (a1_pow.txt) 21a generated from speech data (wav_id=20070921001). FIG. 4B shows an example of a pitch value file (a1_pit.txt) 21b.

The power value file 21a in FIG. 4A includes a power value sequence of power values each obtained at every given time (12.8 [msec]). Each row in the power value file 21a shows [a time, a power value].

The pitch value file 21b in FIG. 4B includes a pitch value sequence of pitch values each obtained at every given time (12.8 [msec]). Each row in the pitch value file 21b shows [a time, a pitch value]. The pitch value is recorded only for sections for which the pitch can be calculated.

Step S2: Extraction of Utterance Sections

Based on the power value file 21a, the speech data dividing section 12 detects sections in which a power value equal to or larger than a threshold value th1 continues and its continuous section is at least the minimum utterance time, in the speech data 20 as utterance sections. The speech data dividing section 12 registers the detected utterance sections in the utterance section table 101.

Figure 5:
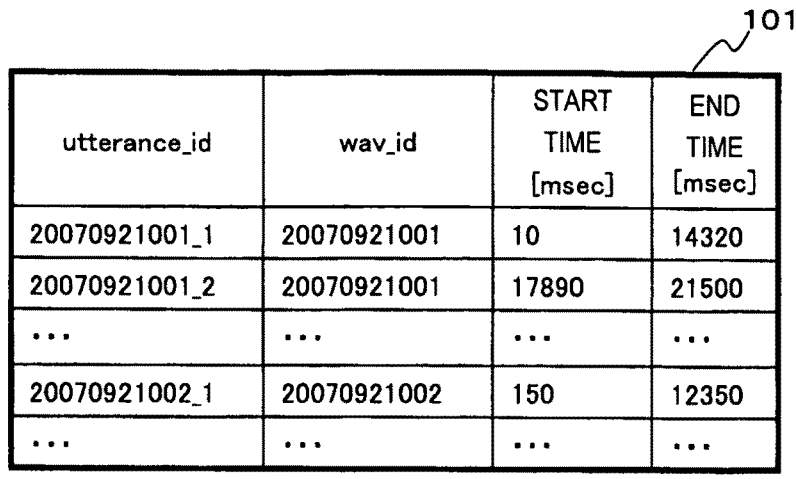
FIG. 5 is a diagram illustrating an example of an utterance section table.

FIG. 5 is a diagram illustrating an example of the utterance section table 101. The utterance section table 101 contains items including utterance_id, wav_id, start time, and end time. Identification information on each utterance section is stored in the utterance_id. Identification information on the speech data 20 including the utterance section is stored in the wav_id. The start time [msec] of the utterance section is stored in the start time. Here, the start time 0 means the beginning of the time of the speech data 20. The end time [msec] of the utterance section is stored in the end time.

Step S3: Division of the Speech Data

Based on the power value file 21a, the speech data dividing section 12 detects sections in which a power value equal to or larger than a threshold value th2 continues, in each of the utterance sections in the speech data 20. The speech data dividing section 12 generates divided speech data 22 from the speech data in each of the detected sections and stores the divided speech data 22. Furthermore, the speech divided data section 12 registers the generated divided speech data 22 in the divided data management table 102.

Figure 6:
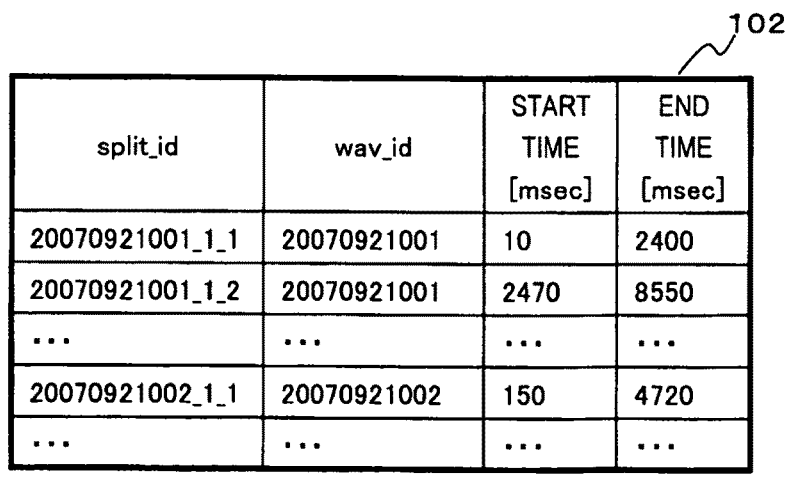
FIG. 6 is a diagram illustrating an example of a divided data management table.

FIG. 6 is a diagram illustrating an example of the divided data management table 102. The divided data management table 102 contains items including split_id, wav_id, start time, and end time. Identification information on the divided speech data 22 is stored in the split_id. Identification information on the speech data 20 including the utterance section is stored in the wav_id. The start time [msec] of the divided speech data 22 is stored in the start time. Here, the start time 0 means the beginning of the time of the speech data 20. The end time [msec] of the divided speech data 22 is stored in the end time.

Figure 7:
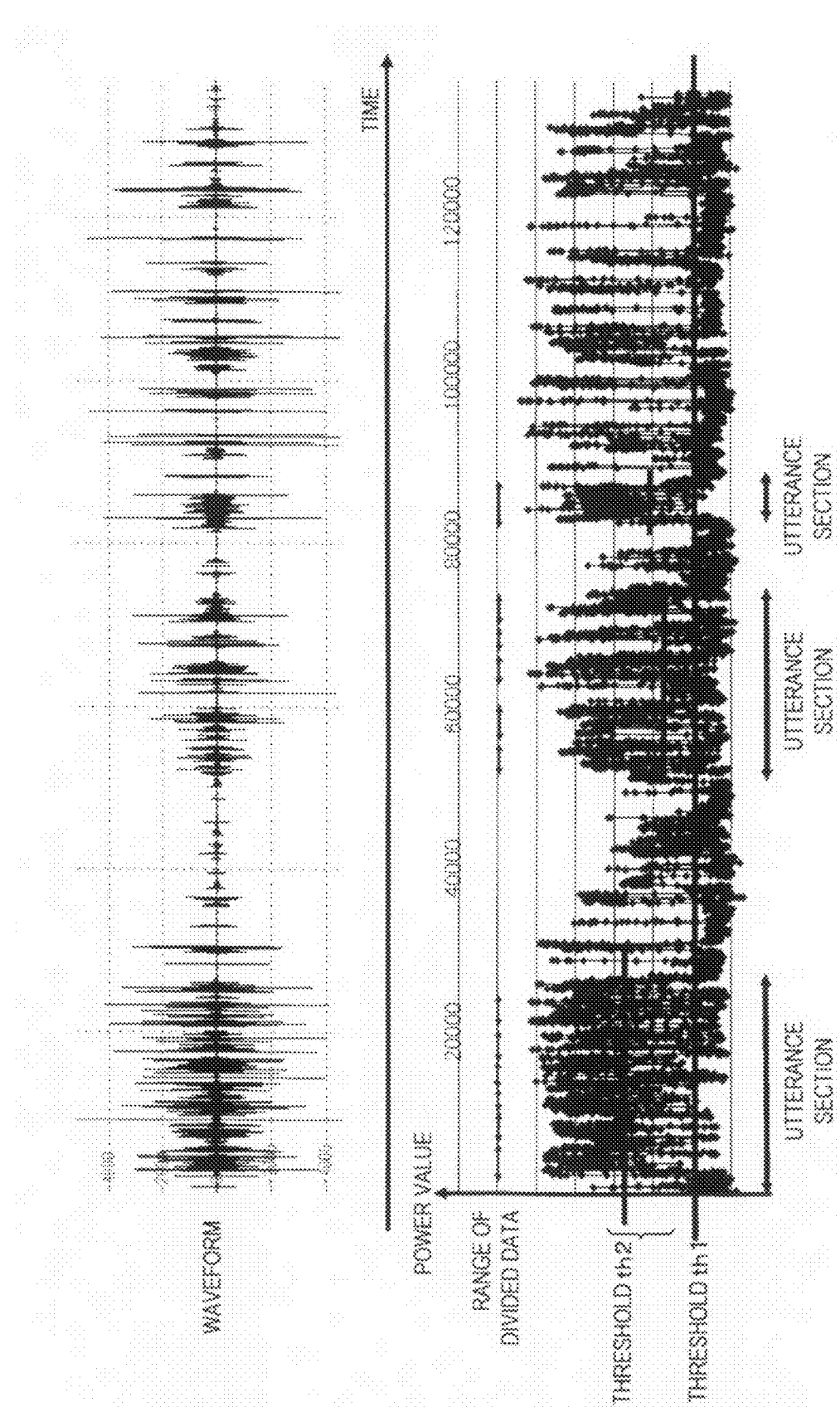
FIG. 7 is a diagram illustrating an example of extraction of an utterance section and division of speech data.

FIG. 7 is a diagram illustrating an example of extraction of utterance sections and division of the speech data.

The upper stage of FIG. 7 shows an example of the waveform of the speech data 20. The lower stage of FIG. 7 shows an example of power values in the speech data 20. As utterance sections, sections are detected in which the state where the speech power value in the speech data 20 is equal to or larger than the threshold value th1 continues for a given time or longer. Moreover, each utterance section is divided into sections in each of which the state where a power value equal to or larger than the threshold value th2 continues for a given time or longer, to generate divided speech data 22.

Figure 8A:
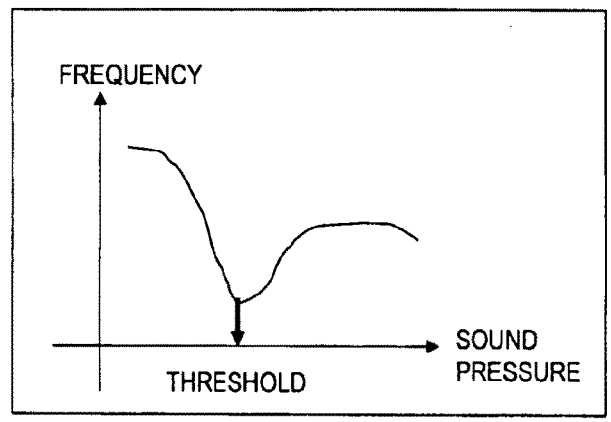
FIGS. 8A and 8B are diagrams illustrating examples of setting of threshold values th1 and th2.
Figure 8B:
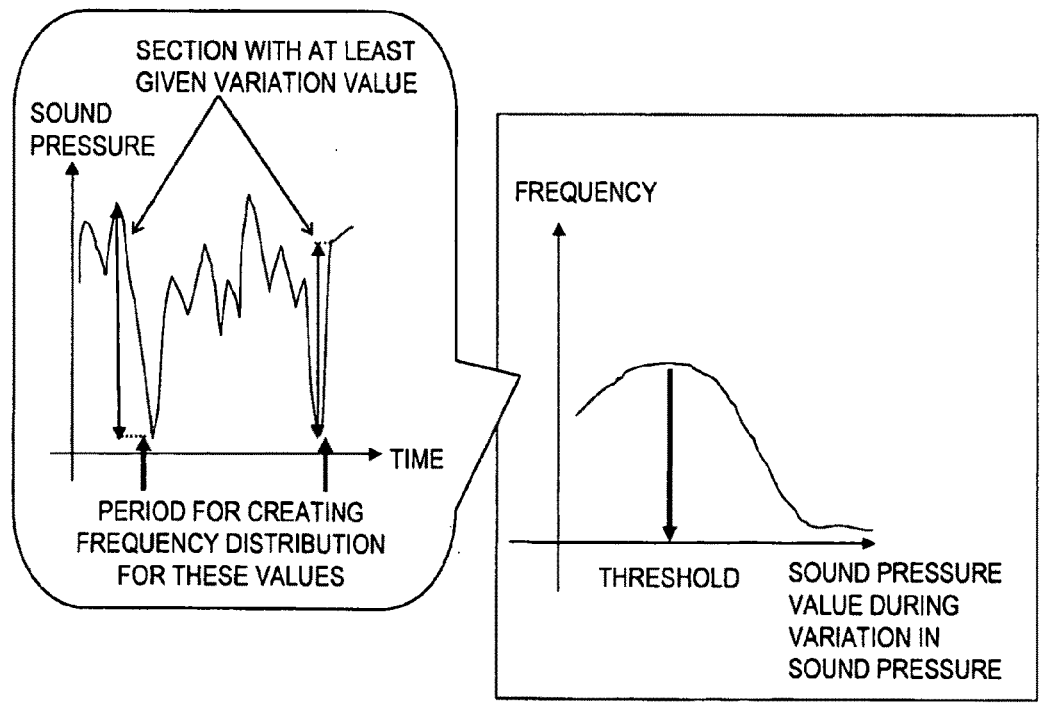

The threshold values th1 and th2 used in the process of extracting utterance sections (step S2) and the process of dividing the speech data (step S3), respectively, are set by one of the calculation processes illustrated in FIG. 8A and FIG. 8B.

In the calculation process in FIG. 8A, the frequency distribution of all the powers in the input speech data 20 is acquired. In the frequency distribution, a power value corresponding to a "valley", that is, the power value with the minimum frequency value, is defined as the threshold value th1.

In the calculation process in FIG. 8B, the frequency distribution of power values (low values) at the position where power changes (differences) of the input speech data exceed a given value is acquired. In the frequency distribution, the power value with the maximum frequency value is defined as the threshold value th1.

The threshold value th2 is calculated by a similar process using, as an input, the speech data 20 corresponding to the utterance section to be processed.

Step S4: Acquisition of a Phoneme Sequence

The phoneme recognizing section 14 recognizes phonemes from the divided speech data 22. The phoneme recognizing section 14 is a processing unit to carry out one of conventional phoneme recognition processing techniques. The speech recognition processing techniques are well-known may be capable of outputting phoneme data as intermediate information. For example, a processing device such as "Julius speech recognition engine (http://julius.sourceforge.jp/)" may be used. Here, the phoneme may be a monophone or a triphone. Alternatively, the phoneme may be a lattice.

The phoneme sequence acquiring section 13 generates phoneme sequence data 23 corresponding to the divided speech data 22 based on phoneme recognition results that are the results of processing executed by the phoneme recognizing section 14. Furthermore, the phoneme sequence acquiring section 13 registers the generated phoneme sequence data 23 in the phoneme recognition result table 103.

Figure 9:
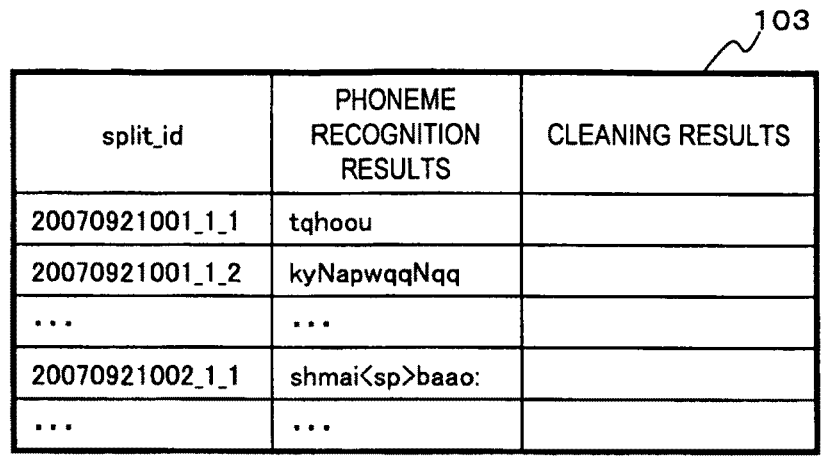
FIG. 9 is a diagram illustrating an example of a phoneme recognition result table.

FIG. 9 is a diagram illustrating an example of the phoneme recognition result table 103. The phoneme recognition result table 103 contains items including split_id, phoneme recognition results, and cleaning results.

Identification information on the divided speech data 22 is stored in the split_id. The phoneme sequence data 23 generated by the phoneme recognizing section 14 is stored in the phoneme recognition results. The phoneme sequence data 23' cleaned as described below is stored in the cleaning results.

For example, executing a speech recognition process on the divided speech data 22 of split_id=20070921001_1_1 results in phoneme sequence data "tqhoou".

Step S5: Cleaning of the Phoneme Sequence Data

The phoneme sequence acquiring section 13 applies predetermined cleaning rules to execute a cleaning process on the phoneme recognition results (phoneme sequence) that are the results of processing executed by the phoneme recognizing section 14.

Examples of the cleaning rules in Japanese are shown below.

Cleaning rule 1: a long sound (for example, "o:" or "ou") and a short sound (for example, "o") are grouped.

Cleaning rule 2: uncertain results are removed (for example, consecutive "sokuons")

Cleaning rule 3: consecutive consonants in a phoneme sequence are removed.

Cleaning rule 4: if the phoneme sequence contains a silent section (<sp>), the phoneme sequence is divided into two at that position.

If the phoneme sequence data 23 is divided at a silent section, one row is added to the phoneme recognition result table 103, and new identification information (split_id) for the divided phoneme sequence data is then applied to the table 103 for registration.

Figure 10:
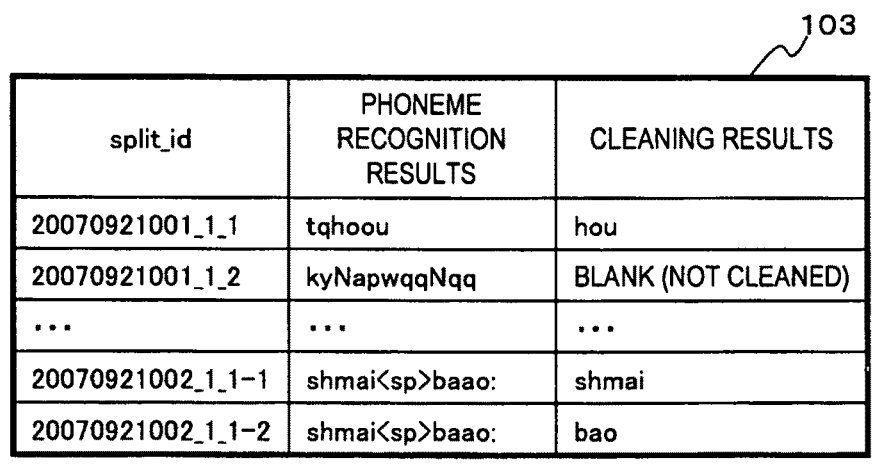
FIG. 10 is a diagram illustrating an example of a phoneme recognition result table in which cleaned phoneme sequences are stored.

FIG. 10 is a diagram illustrating an example of the phoneme recognition result table 103 in which the cleaned phoneme sequence data 23' is stored.

The phoneme sequence data 23 "tqhoou" is cleaned to obtain the phoneme sequence data 23' "hou".

Step S6: Clustering

The clustering section 15 uses one of well-known clustering techniques to classify all the phoneme sequence data 23' and generates cluster data 24 that is a set (cluster) of the classified phoneme sequence data 23'.

Figure 11:
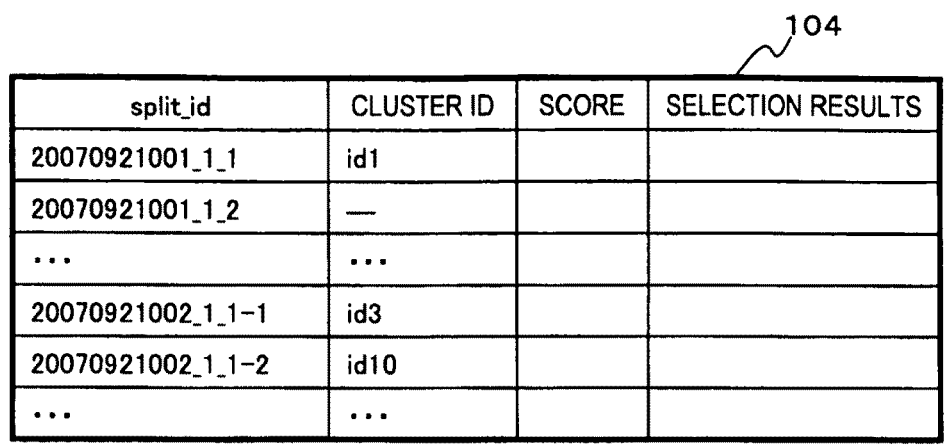
FIG. 11 is a diagram illustrating an example of a cluster management table.

The cluster data 24 is implemented as a cluster table 104 illustrated in FIG. 11.

The cluster table 104 contains items including split_id, a cluster ID, a score, and selection results.

Identification information on the divided speech data 22 (phoneme sequence) is stored in the split_id. Identification information on the clusters into which the phoneme sequence data 23' is classified is stored in the cluster ID. An evaluation value for the cluster is stored in the score. Information indicating whether or not the data has been selected as a listening target is stored in the selection results.

Step S7: Calculation of Evaluation Values

The evaluation value calculating section 16 combines one or more of the following evaluation process to calculate an evaluation value (score) for each of the clusters in the cluster data 24.

In the present embodiment, the evaluation value calculating section 16 executes the following plurality of evaluation processes to determine the sum of the calculated values to be a score S.

Figure 12:
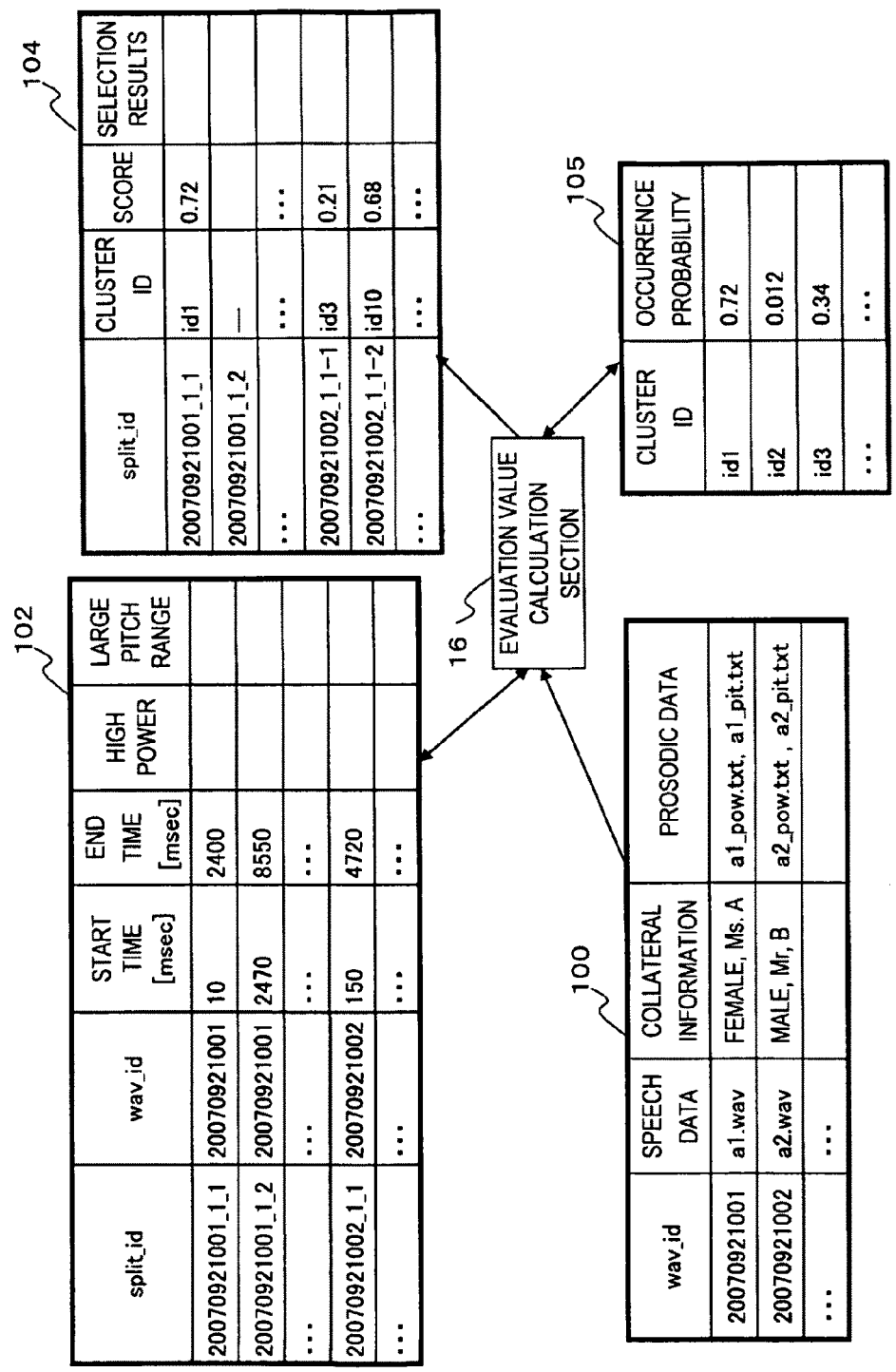
FIG. 12 is a diagram illustrating an evaluation value calculating process.

Evaluation value calculating process S71: calculation of the evaluation value based on appearance frequency information Evaluation value calculating process S73: calculation of the evaluation value based on the power value Evaluation value calculating process S75: calculation of the evaluation value based on the pitch value Evaluation value calculating process S77: calculation of the evaluation value based on word fitness information (1) Evaluation Value Calculating Process S71: Calculation of the Evaluation Value Based on Appearance Frequency Information As illustrated in FIG. 12, the evaluation value calculating section 16 uses the speech data management table 100 and the divided data management table 102 to calculate the score A for each cluster in accordance with the following Expression (1). The evaluation value calculating section 16 records the score A in the phoneme sequence appearance probability management table 105.

$$\text{Score } A = \text{the number of speech data in which the phoneme sequence in the cluster appears/the total number of speech data} \quad \text{Expression (1)}$$

The score A corresponds to a document frequency (DF) in a document (text) data evaluating process, and is higher for a cluster containing information appearing at a high frequency. A tendency to repeatedly speak important phrases during an utterance is utilized to set high scores for clusters containing many data indicating the same, relatively frequently spoken word. This improves evaluation accuracy.

(2) Evaluation Value Calculating Process S73: Calculation of the Evaluation Value Based on the Power Value As illustrated in FIG. 12, the evaluation value calculating section 16 configures the divided data management table 102 by adding a high-power item thereto. Then, if the power value of the divided speech data 22 exceeds the average power value of the speech data 20 including the divided speech data 22, a flag (=1) is set in the "high power value" in the divided data management table 102.

Moreover, the following Expression (2) is used to calculate the appearance frequency of the divided speech data 22 with the flag (1) set in the high power value in the divided data management table 102, with respect to the total number of divided speech data.

$$\text{Score } B = \text{the number of divided speech data with the high power flag set therefore/the total number of divided speech data} \quad \text{Expression (2)}$$

For the score B, a cluster containing data indicating a loudly spoken word receives a high score based on the characteristic that important phrases are spoken out loudly. A tendency to speak out important phrases louder than the other phrases during an utterance is utilized to set high scores for clusters containing data indicating a word spoken louder than the other data. This improves the evaluation accuracy.

(3) Evaluation Value Calculating Process S75: Calculation of the Evaluation Value Based on the Pitch Value As illustrated in FIG. 12, the evaluation value calculating section 16 configures the divided data management table 102 by adding a large-pitch-range item thereto. Then, if the pitch range value of the divided speech data 22 exceeds the average pitch range value of the speech data 20 including the divided speech data 22, a flag (=1) is set in the "large pitch range" in the divided data management table 102.

Moreover, the following Expression (3) is used to calculate the appearance frequency of the divided speech data 22 with the flag (1) set in the large pitch range in the divided data management table 102, with respect to the total number of divided speech data.

Score C=the number of divided speech data with the large pitch range flag set therefore/the total number of divided speech data        Expression (3)

For the score C, a cluster containing data indicating a word spoken with intonation (large pitch range) receives a high score based on the characteristic that important phrases are spoken out clear and loud. A tendency to speak important phrases with intonation during an utterance is utilized to set high scores for clusters containing data indicating a voice with a higher intonation, that is, a larger pitch range than the other data. This improves the evaluation accuracy.

(4) Evaluation Value Calculating Process S77: Calculation of the Evaluation Value Based on Word Fitness Information The speech recognition dictionary creating support device 1 is configured such that to carry out the processing in step S77, the evaluation value calculating section 16 can reference a morpheme analysis dictionary 27 and character conversion rule storage means 28 which are used in a morpheme analyzing process.

Figure 13A:
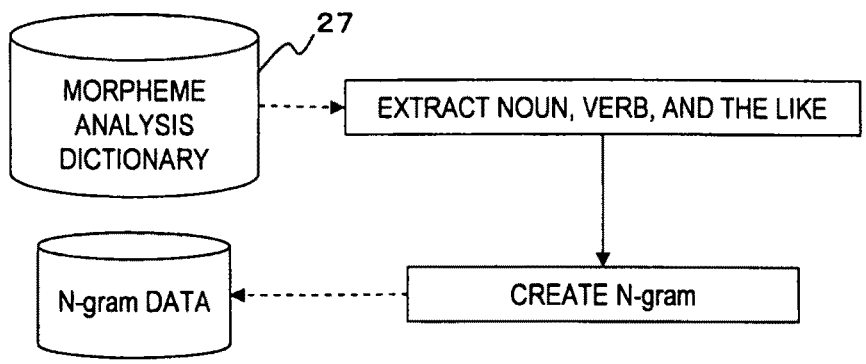
FIGS. 13A and 13B are diagrams illustrating an evaluation value calculating process based on word fitness information.
Figure 13B:
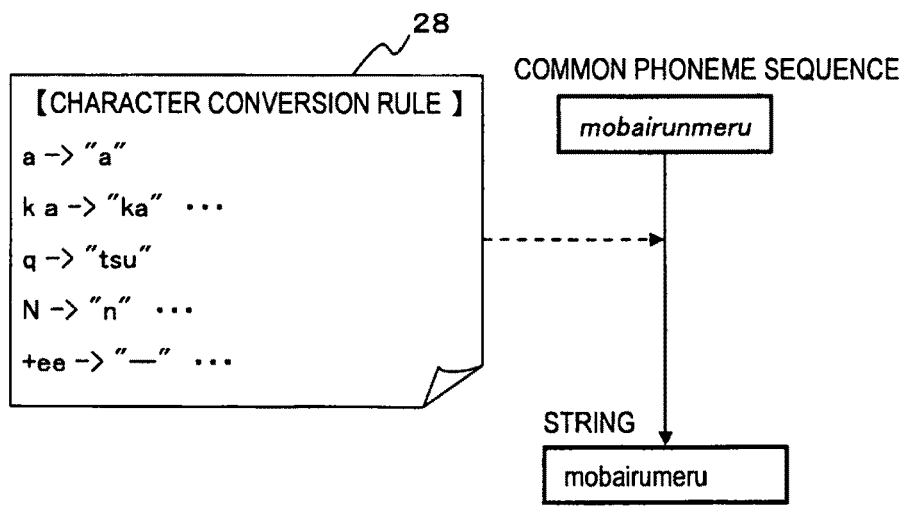

As illustrated in FIG. 13A, the evaluation value calculating section 16 extracts a phrase classified into a word class such as a noun or a verb which is used as a keyword, from the morpheme analysis dictionary 27 to generate a character n-gram for the extracted phrase. Moreover, as illustrated in FIG. 13B, the evaluation value calculating section 16 extracts a common subsequence of the phoneme sequence data 23' constituting the cluster. The evaluation value calculating section 16 references character conversion rules for the common phoneme sequence (for example, "mobairunmeru") to generate a character string (for example, "mobairumeru").

Then, the evaluation value calculating section 16 uses the character n-gram to calculate the appearance probability of the common phoneme sequence in the character string of the extracted phrase. The evaluation value calculating section 16 records the appearance probability for each cluster in a phoneme sequence appearance probability management table 105. This appearance probability is defined as a score D.

The score D is adapted to remove interjections such as "etto" and "ano" from keyword selection targets to set high scores for clusters containing data indicating high "word fitness" for the keyword. The use of the keyword fitness allows the evaluation accuracy to be increased.

After each processing in steps S71, S73, S75, and S77, the evaluation value calculating section 16 calculates the score S for each cluster in accordance with the following Expression (4):

Score $S=\alpha *A+\beta *B+\gamma *C+\delta *D$        (4)

($\alpha+\beta+\gamma+\delta=1$, $0 \leq \alpha \leq 1$, $0 \leq \beta \leq 1$, $0 \leq \gamma \leq 1$, $0 \leq \delta \leq 1$)

Step S8: Selection of a Candidate Cluster

The candidate cluster selecting section 17 selects clusters with high scores as candidate clusters based on the scores in the cluster table 104. For example, the candidate cluster selecting section 17 selects clusters with a score value equal to or larger than a threshold value th3, or a number n of high-score clusters from the top in the orders.

Then, as illustrated in FIG. 14, a flag (=○) indicating that the cluster is selected as a candidate cluster is set in the selection results items for the selected cluster IDs in the cluster table 104. A value (=x) indicating that the cluster is not selected as a candidate cluster may be set in the selection results items.

Step S9: Selection of Listening Target Data

As illustrated in FIG. 15A, the listening target data selecting section 18 selects a representative phoneme sequence for each of the candidate clusters selected from the cluster table 104, from the phoneme sequence data 23' constituting the candidate cluster, as follows.

Selection rule 1: the representative phoneme sequence is one of the phoneme sequences in the cluster which has the largest sequence length Selection rule 2: the representative phoneme sequence is one of the phoneme sequences in the cluster which has the largest number of divided speech data corresponding to each phoneme sequence Selection rule 3: Processing similar to that in step S77 is executed to calculate the "word fitness" of each phoneme sequence to determine a phoneme sequence with a large value to be a representative phoneme sequence.

As illustrated in FIG. 15B, the listening target data selecting section 18 selects one of the phoneme sequence data 23' constituting the cluster ID=id5 which has a large number of phoneme sequences, as a representative phoneme sequence. For example, the listening target data selecting section 18 selects phoneme sequence data 23' with split_id=20070921001_1_1 and the phoneme sequence="mobairunmeru", as a representative phoneme sequence.

Then, as illustrated in FIG. 15C, the listening target data selecting section 18 selects divided speech data 22_1 corresponding to the selected representative phoneme sequence. Then, the listening target data selecting section 18 outputs the divided speech data 22_1 as listening target data and stores the data 22_1 in the dictionary candidate phrase speech database 25.

Here, if a specified type 110 indicative of the attribute of speech data selected as a listening target has been input by the user, the listening target data selecting section 18 refers to the collateral information in the speech data management table 100 and stores divided speech data 22 matching with the collateral information in the dictionary candidate phrase speech database 25.

The specified type 110 is information specifying attributes of voices in speech data, for example, a loud voice or a female voice. The specified type 110 enables specification of speech properties allowing the user to easily listen to the voice.

If the listening target data selecting process is executed without using the specified type 110, which specifies the attributes, the collateral information item in the speech data management table 100 is not required.

Thereafter, the adoption determining section 19 reproduces the divided speech data 22 stored in the dictionary candidate phrase speech database 25. The adoption determining section 19 includes an interface allowing a user having listened to the reproduced speeches to determine whether or not the speech data is to be adopted as registration data for the speech recognition dictionary 26. If the user inputs data indicating that the data can be adopted, the adoption determining section 19 registers the divided speech data 22 in the speech recognition dictionary 26.

FIGS. 16 to 21 are more detailed process flow diagrams of the processing in steps S71, S73, S75, and S77 of the evaluation value calculating process (step S7).

Figure 16:
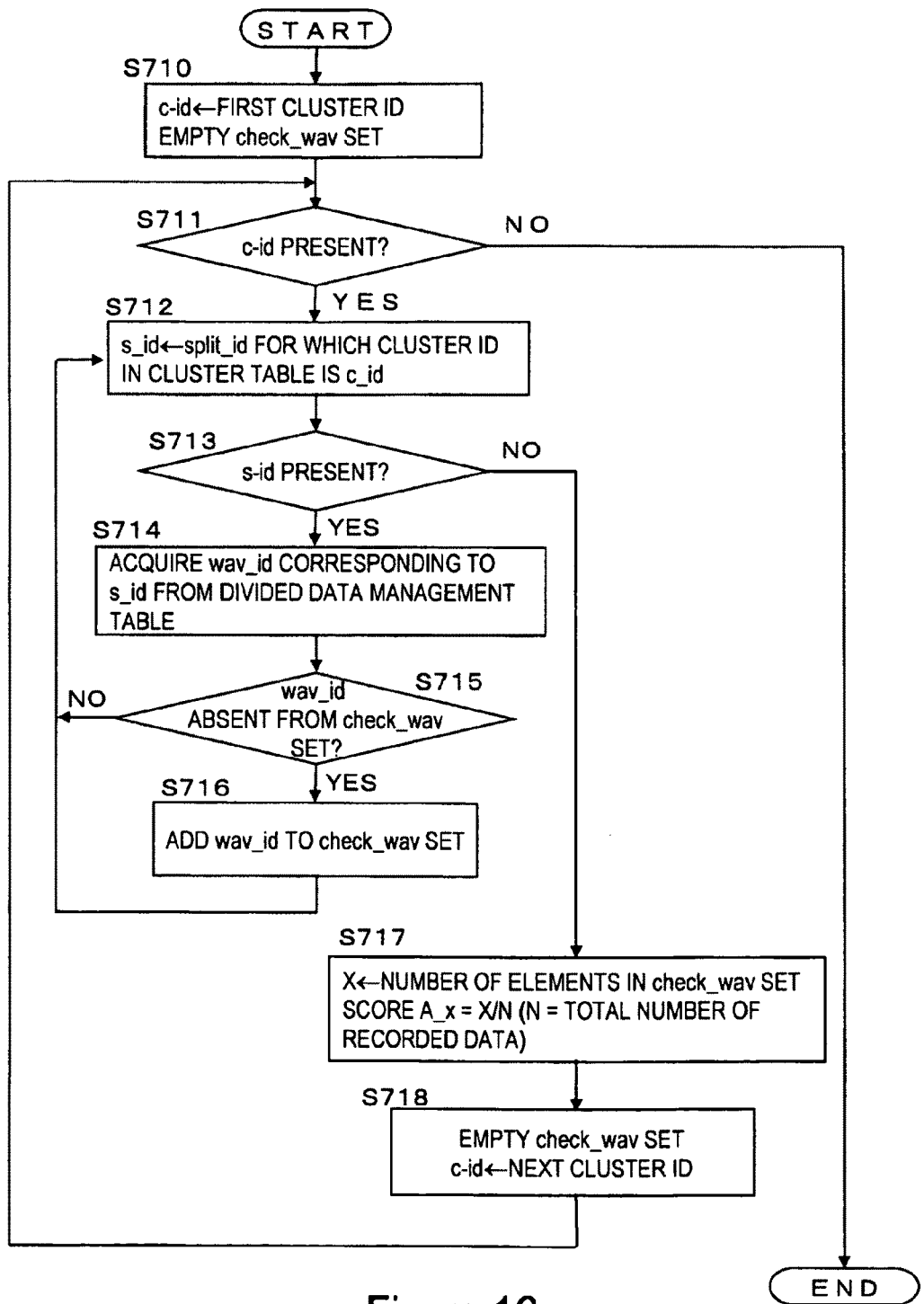
FIG. 16 is a more detailed process flow diagram of an evaluation value calculating process (step S71) based on appearance frequency information.

FIG. 16 is a more detailed process flow diagram of the evaluation value calculation process (step S71) based on appearance frequency information.

The evaluation value calculating section 16 substitutes the first cluster ID in the cluster table 104 into c-id, and empties a check_wav set (step S710).

Then, if there is any unprocessed c-id (YES in step S711), the evaluation value calculating section 16 detects the split_id for which the cluster ID in the cluster table 104 is c_id, and substitutes the split_id into s_id (step S712).

Moreover, if there is any unprocessed s_id (YES in step S713), the evaluation value calculating section 16 acquires the wav_id corresponding to the s_id from the divided data management table 102 (step S714).

Moreover, if the elements of the check_wav set do not include the wav_id (YES in step S715), the evaluation value calculating section 16 adds the wav_id to the elements of the check_wav set (step S716). If the elements of the check_wav set include the wav_id (NO in step S715), the evaluation value calculating section 16 returns to the processing in step S712.

In step S713, if there is no unprocessed s_id (NO in step S713), the evaluation value calculating section 16 substitutes the number of elements in the check_wav set into X to calculate a score A_x=X/N (N=the total number of speech data) (step S717).

Then, the evaluation value calculating section 16 empties the check_wav set, and substitutes the next cluster ID in the cluster table 104 into the c-id. The evaluation value calculating section 16 then returns to the processing in step S711 (step S718).

In step S711, if there is no unprocessed c-id (NO in step S711), the evaluation value calculating section 16 terminates the process.

Figure 17:
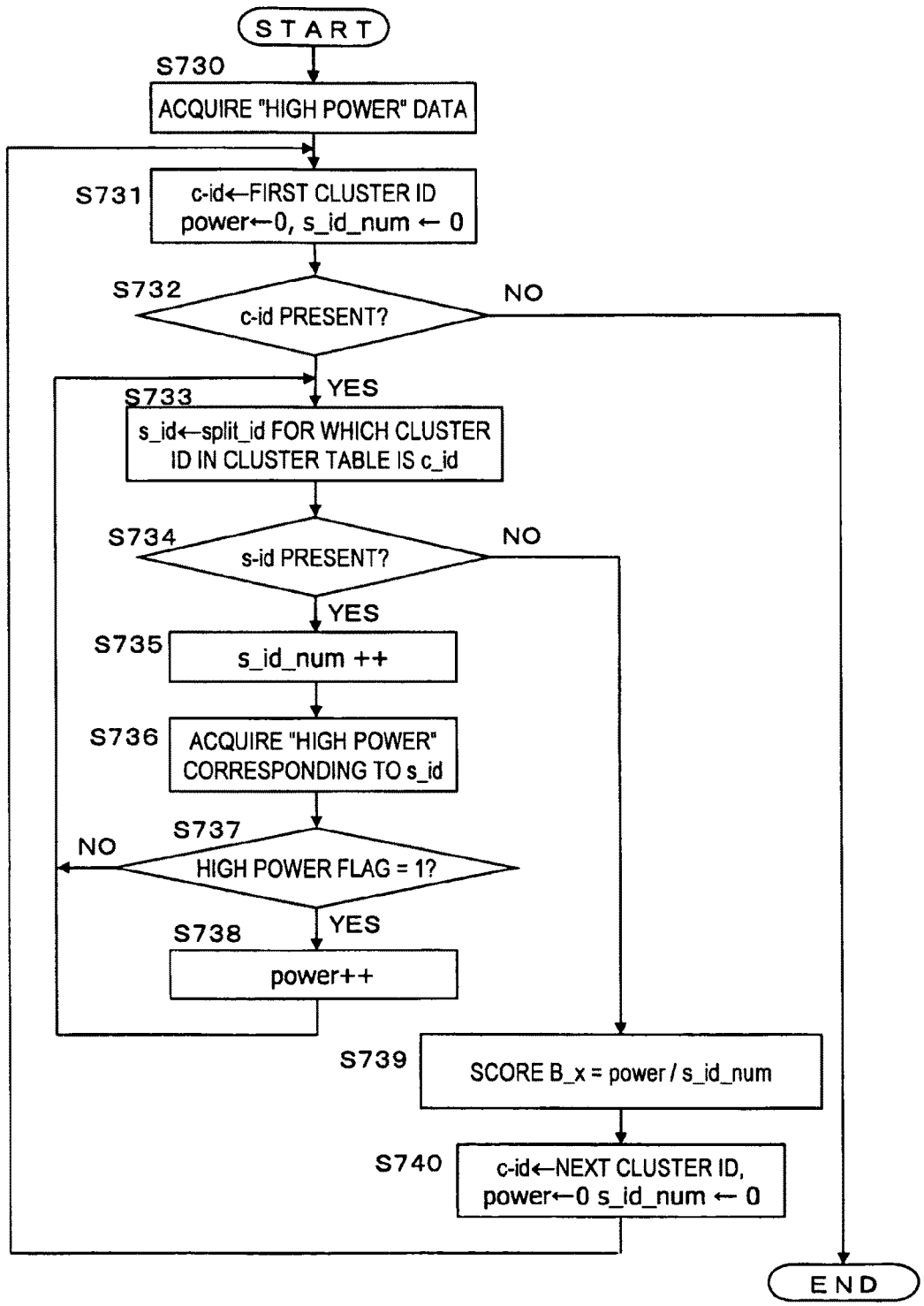
FIG. 17 is a more detailed process flow diagram of an evaluation value calculating process (step S73) based on a power value.

FIG. 17 is a more detailed process flow diagram of the evaluation value calculating process (step S73) based on the power value.

The evaluation value calculating section 16 acquires the high-power value in the divided data management table 102 (step S730). The processing in step S730 will be described below in detail.

Then, the evaluation value calculating section 16 substitutes the first cluster ID in the cluster table 104 into the c_id. The evaluation value calculating section 16 further substitutes 0 (zero) into both power and s_id_num (step S731).

If there is any unprocessed c-id (YES in step S732), the evaluation value calculating section 16 detects the split_id for which the cluster ID in the cluster table 104 is the c_id. The evaluation value calculating section 16 then substitutes the split_id into the s_id (step S733).

Moreover, if there is any unprocessed s_id (YES in step S734), the evaluation value calculating section 16 increments the s_id_num (by one) (step S735) and acquires the data with high power corresponding to the s_id (step S736). If the flag (1) is set in the high power (YES in step S737), the evaluation value calculating section 16 increments the power (step S738). If the flag (1) is not set in the high power (NO in step S737), the evaluation value calculating section 16 returns to the processing in step S733.

In step S734, if there is no unprocessed s_id (NO in step S734), the evaluation value calculating section 16 calculates a score B_x=power/s_id_num (step S739).

The evaluation value calculating section 16 substitutes the next cluster ID in the cluster table 104 into the c-id, and substitutes 0 (zero) into both power and s_id_num. The evaluation value calculating section 16 then returns to the processing in step S731 (step S740).

In step S732, if there is no unprocessed c-id (NO in step S732), the evaluation value calculating section 16 terminates the process.

Figure 18:
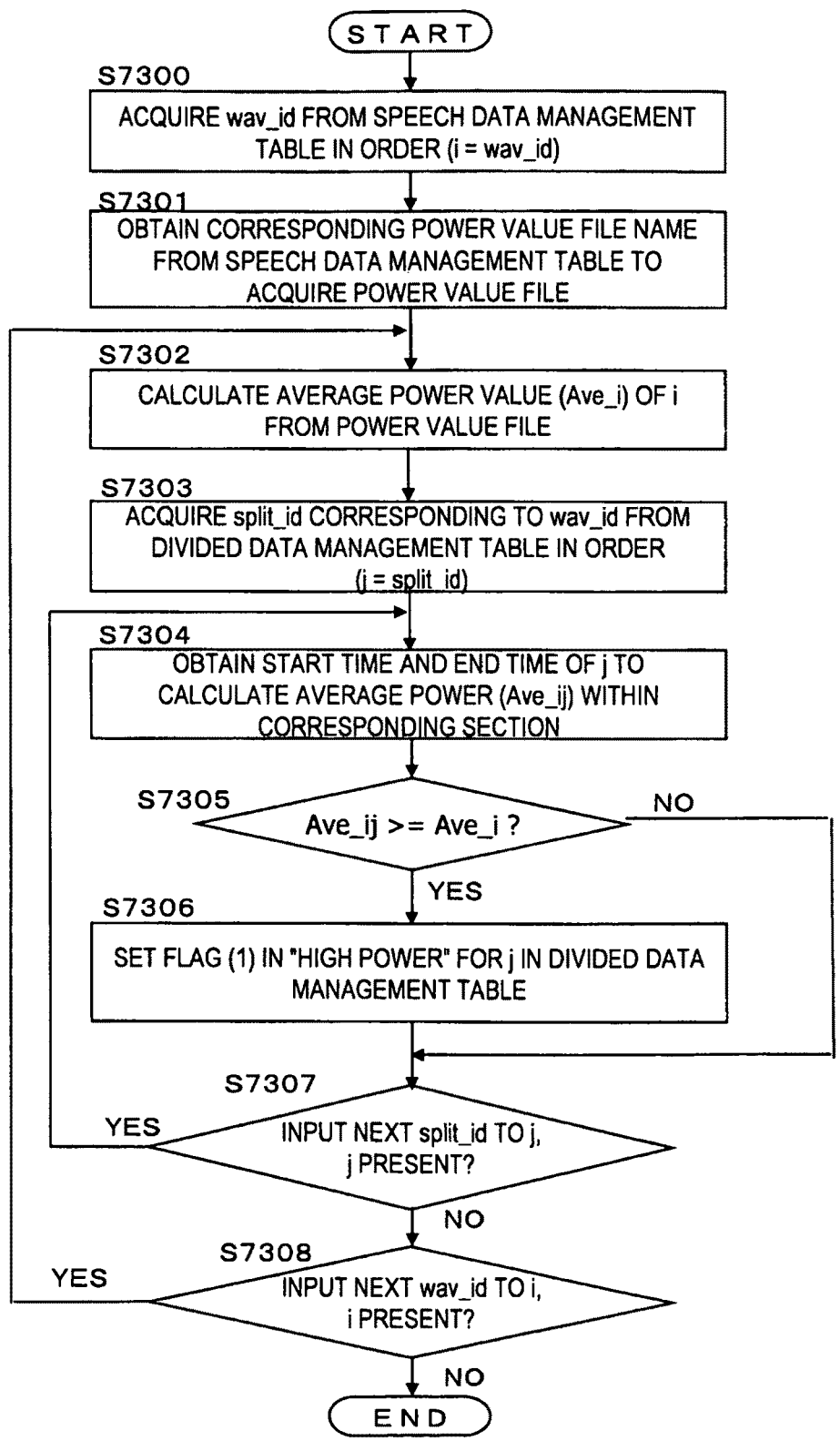
FIG. 18 is a more detailed process flow diagram of a process of acquiring a high-power value from a divided data management table (step S730)

FIG. 18 is a more detailed process flow diagram of a process of acquiring the high-power value contained in the divided data management table 102 (step S730).

The evaluation value calculating section 16 acquires the wav_id from the speech data management table 100 in order (i=wav_id) (step S7300). The evaluation value calculating section 16 obtains the corresponding power value file name and thus a power value file 21a (step S7301). The evaluation value calculating section 16 calculates the average power value (Ave_i) of (i) based on the power value file 21a (step S7302).

Then, the evaluation value calculating section 16 acquires the split_id corresponding to the wav_id in order (j=split_id) (step S7303), and acquires the start time and end time of (j). The evaluation value calculating section 16 calculates the average power value (Ave_ij) of the corresponding section (step S7304).

The evaluation value calculating section 16 compares the average power value Ave_ij with the average power value Ave_i. Then, only if Ave_ij>=Ave_i (YES in step S7305), the evaluation value calculating section 16 sets the flag (1) in the high power in the divided data management table 102 (step S7306).

Then, the evaluation value calculating section 16 inputs the next split_id to the (j). If there is any unprocessed (j) (YES in step S7307), the evaluation value calculating section 16 returns to the processing in step S7304. If there is no unprocessed (j) (NO in step S7307), the evaluation value calculating section 16 proceeds to the processing in step S7308.

Moreover, the evaluation value calculating section 16 inputs the next wav_id to the (i). If there is any unprocessed (i) (YES in step S7308), the evaluation value calculating section 16 returns to the processing in step S7302. If there is no unprocessed (i) (NO in step S7308), the evaluation value calculating section 16 terminates the processing in step S7308.

Figure 19:
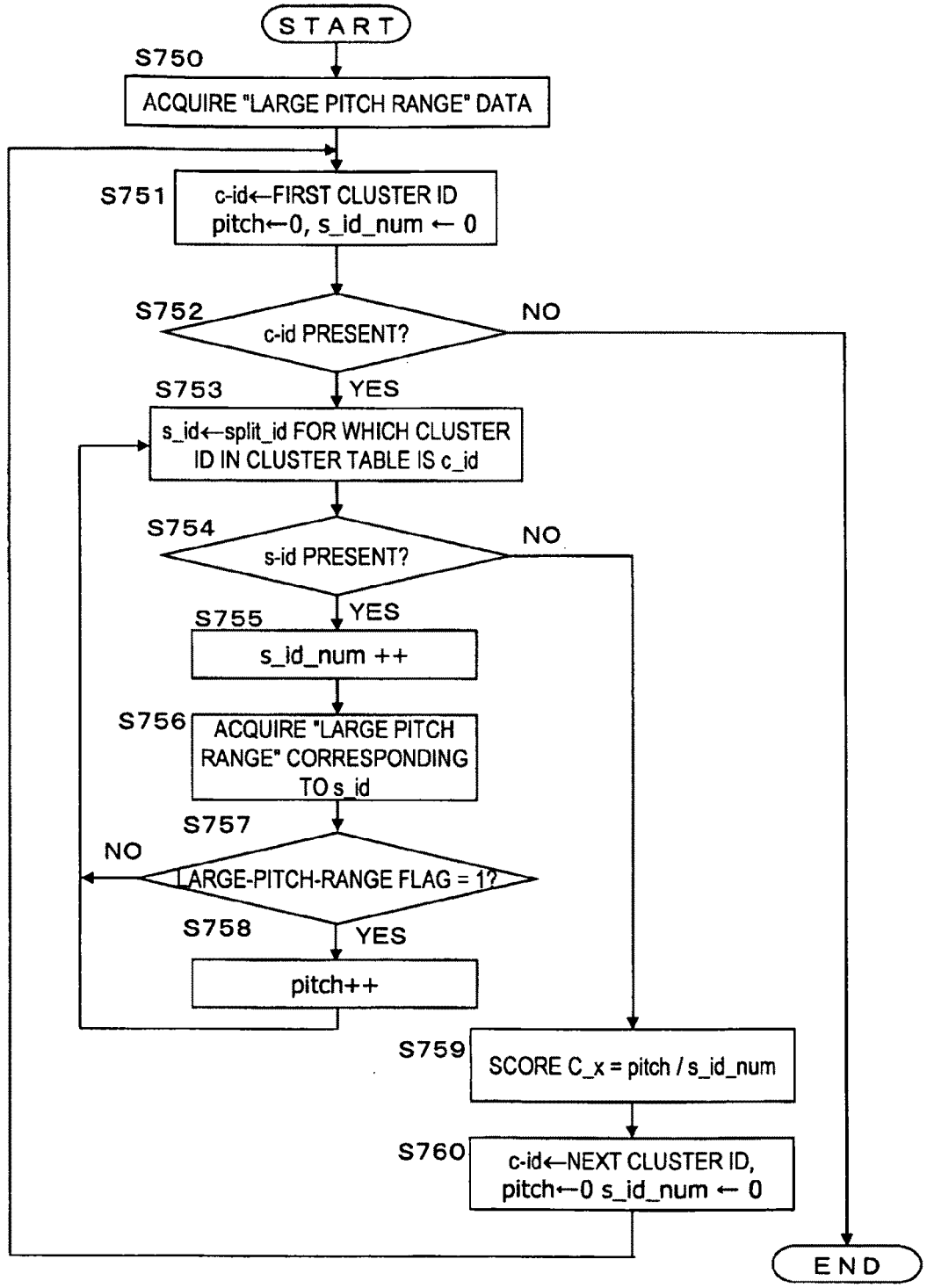
FIG. 19 is a more detailed process flow diagram of an evaluation value calculating process based on a pitch value (step S75)

FIG. 19 is a more detailed process flow diagram of the evaluation value calculating process (step S75) based on the pitch value.

The evaluation value calculating section 16 acquires the large-pitch-range value contained in the divided data management table 102 (step S750). The processing in step S750 will be described below in detail.

Then, the evaluation value calculating section 16 substitutes the first cluster ID in the cluster table 104 into the c_id. The evaluation value calculating section 16 further substitutes 0 (zero) into both pitch and s_id_num (step S751).

If there is any unprocessed c-id (YES in step S752), the evaluation value calculating section 16 detects the split_id for which the cluster ID in the cluster table 104 is the c_id. The evaluation value calculating section 16 then substitutes the split_id into the s_id (step S753).

Moreover, if there is any unprocessed s_id (YES in step S754), the evaluation value calculating section 16 increments the s_id_num (step S755) and acquires the large-pitch-range value corresponding to the s_id (step S756). If the flag (1) is set in the large pitch value (YES in step S757), the evaluation value calculating section 16 increments the pitch (step S758). If the flag (1) is not set in the large pitch value (NO in step S757), the evaluation value calculating section 16 returns to the processing in step S753.

In step S754, if there is no unprocessed s_id (NO in step S754), the evaluation value calculating section 16 calculates a score C_x=pitch/s_id_num (step S759).

The evaluation value calculating section 16 substitutes the next cluster ID in the cluster table 104 into the c-id, and substitutes 0 (zero) into both pitch and s_id_num. The evaluation value calculating section 16 then returns to the processing in step S751 (step S760).

In step S752, if there is no unprocessed c-id (NO in step S752), the evaluation value calculating section 16 terminates the process.

Figure 20:
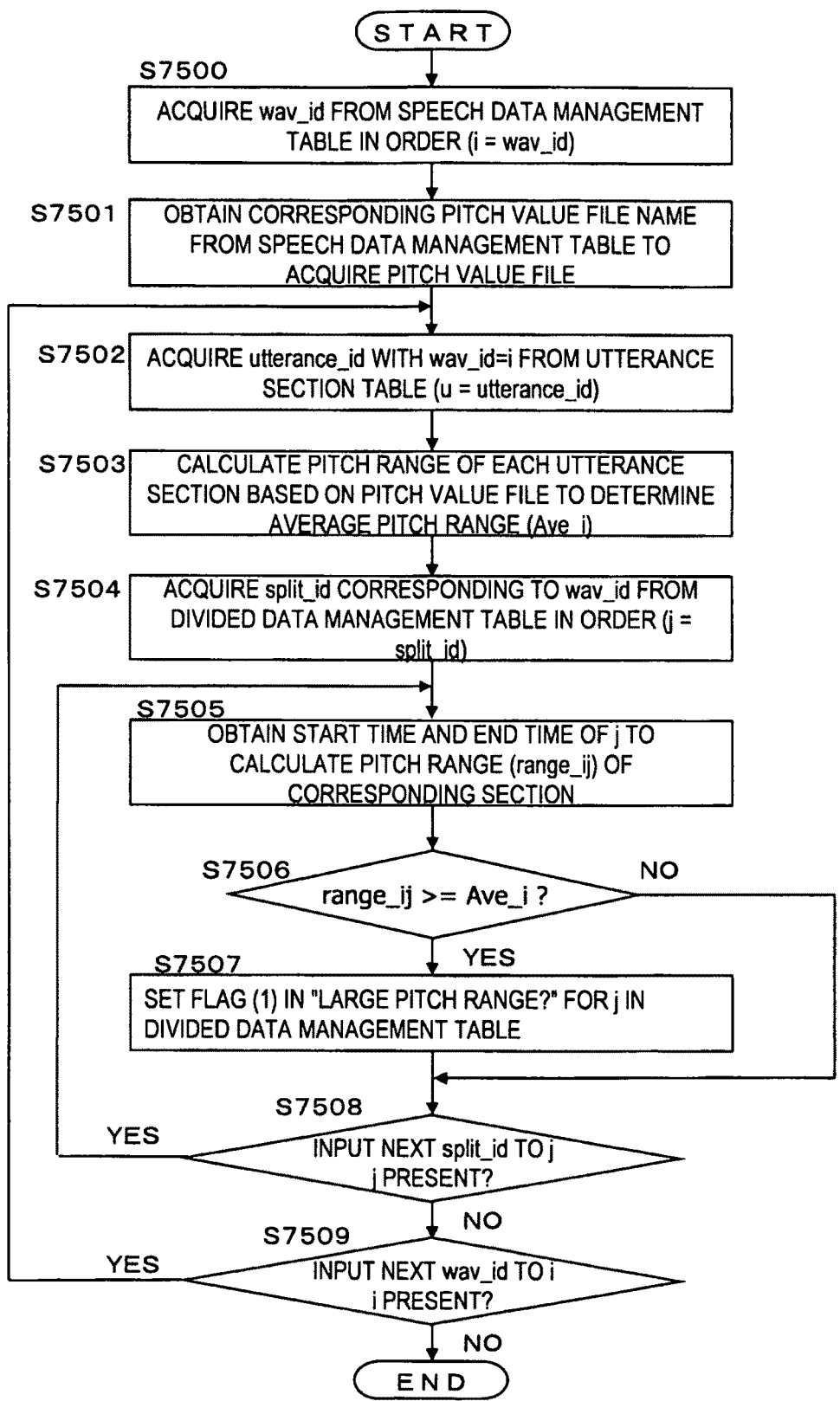
FIG. 20 is a more detailed process flow diagram of a process of acquiring a large-pitch-range value from a divided data management table (step S750)

FIG. 20 is a more detailed process flow diagram of a process of acquiring the large-pitch-range value contained in the divided data management table 102 (step S750).

The evaluation value calculating section 16 acquires the wav_id from the speech data management table 100 in order (i=wav_id) (step S7500). The evaluation value calculating section 16 obtains the corresponding pitch value file name and thus a pitch value file 21b (step S7501).

The evaluation value calculating section 16 acquires the utterance_id with wav_id=i in order (u=utterance_id) (step S7502) from the utterance section table 101. The evaluation value calculating section 16 then calculates the pitch range of each utterance section (each section of the utterance) based on the pitch value file 21b, and calculates the average pitch range (Ave_i) (step S7503).

Then, the evaluation value calculating section 16 acquires the split_id corresponding to the wav_id in order (j=split_id) (step S7504) from the divided data management table 102, and acquires the start time and end time of (j). The evaluation value calculating section 16 calculates the pitch range (range_ij) of the corresponding section (step S7505).

The evaluation value calculating section 16 compares the pitch range range_ij of the section with the average pitch range Ave_i. Then, only if range_ij>=Ave_i (YES in step S7505), the evaluation value calculating section 16 sets the flag (1) in the large power range of (j) in the divided data management table 102 (step S7507).

Then, the evaluation value calculating section 16 inputs the next split_id to the (j). If there is any unprocessed (j) (YES in step S7508), the evaluation value calculating section 16 returns to the processing in step S7505. If there is no unprocessed (j) (NO in step S7508), the evaluation value calculating section 16 proceeds to the processing in step S7509.

Moreover, the evaluation value calculating section 16 inputs the next wav_id to the (i). If there is any unprocessed (i) (YES in step S7509), the evaluation value calculating section 16 returns to the processing in step S7502. If there is no unprocessed (i) (NO in step S7509), the evaluation value calculating section 16 terminates the processing in step S7502.

Figure 21:
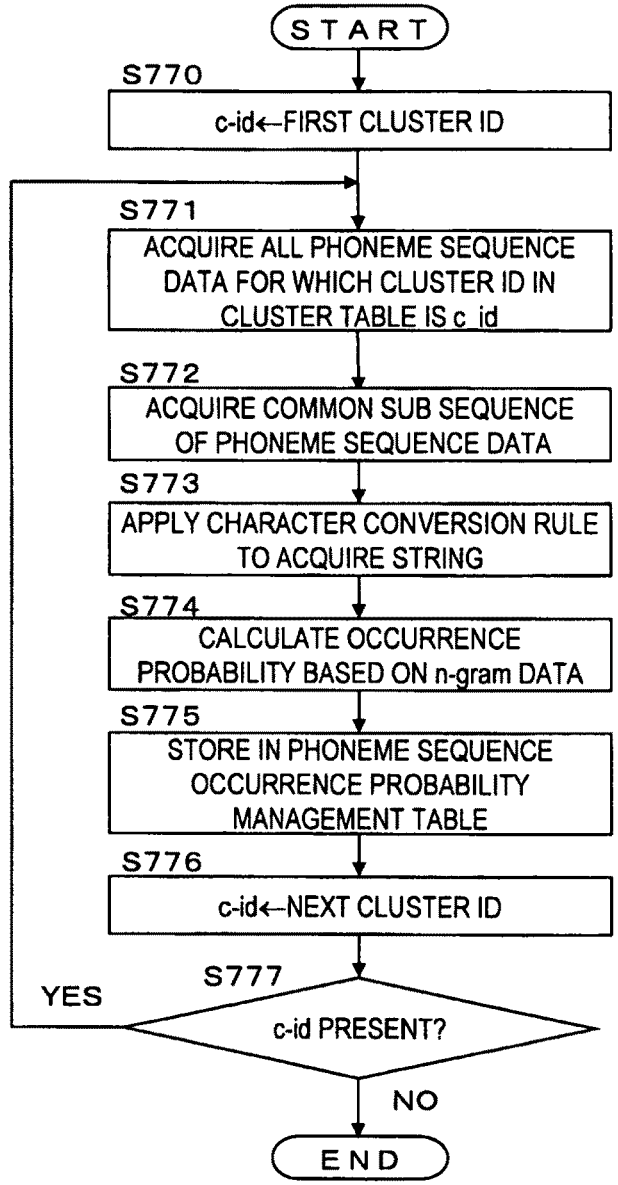
FIG. 21 is a more detailed process flow diagram of an evaluation value calculating process based on word fitness information (step S77)

FIG. 21 is a more detailed process flow diagram of the evaluation value calculating process (step S77) based on word fitness information.

The evaluation value calculating section 16 substitutes the first cluster ID in the cluster table 104 into the c-id (step S770).

The evaluation value calculating section 16 acquires all the phoneme sequence data 23' for which the cluster ID in the cluster table 104 is the c_id (step S771). The evaluation value calculating section 16 further acquires a common subsequence of phoneme sequence (step S772). Moreover, the evaluation value calculating section 16 refers to the character conversion rule storage section 28 and acquires a character string for the common phoneme subsequence (step S773). The evaluation value calculating section 16 calculates the appearance probability of the common phoneme subsequence based on the character n-gram data which is made from the morpheme analysis dictionary 27 (step S774). The evaluation value calculating section 16 stores the appearance probability in the phoneme sequence appearance probability management table 105 (step S775).

The evaluation value calculating section 16 substitutes the next cluster ID in the cluster table 104 into the c-id (step S776). If there is any unprocessed c-id (YES in step S777), the evaluation value calculating section 16 returns to the processing in step S771. If there is no unprocessed c-id (NO in step S777), the evaluation value calculating section 16 terminates the process.

Figure 22:
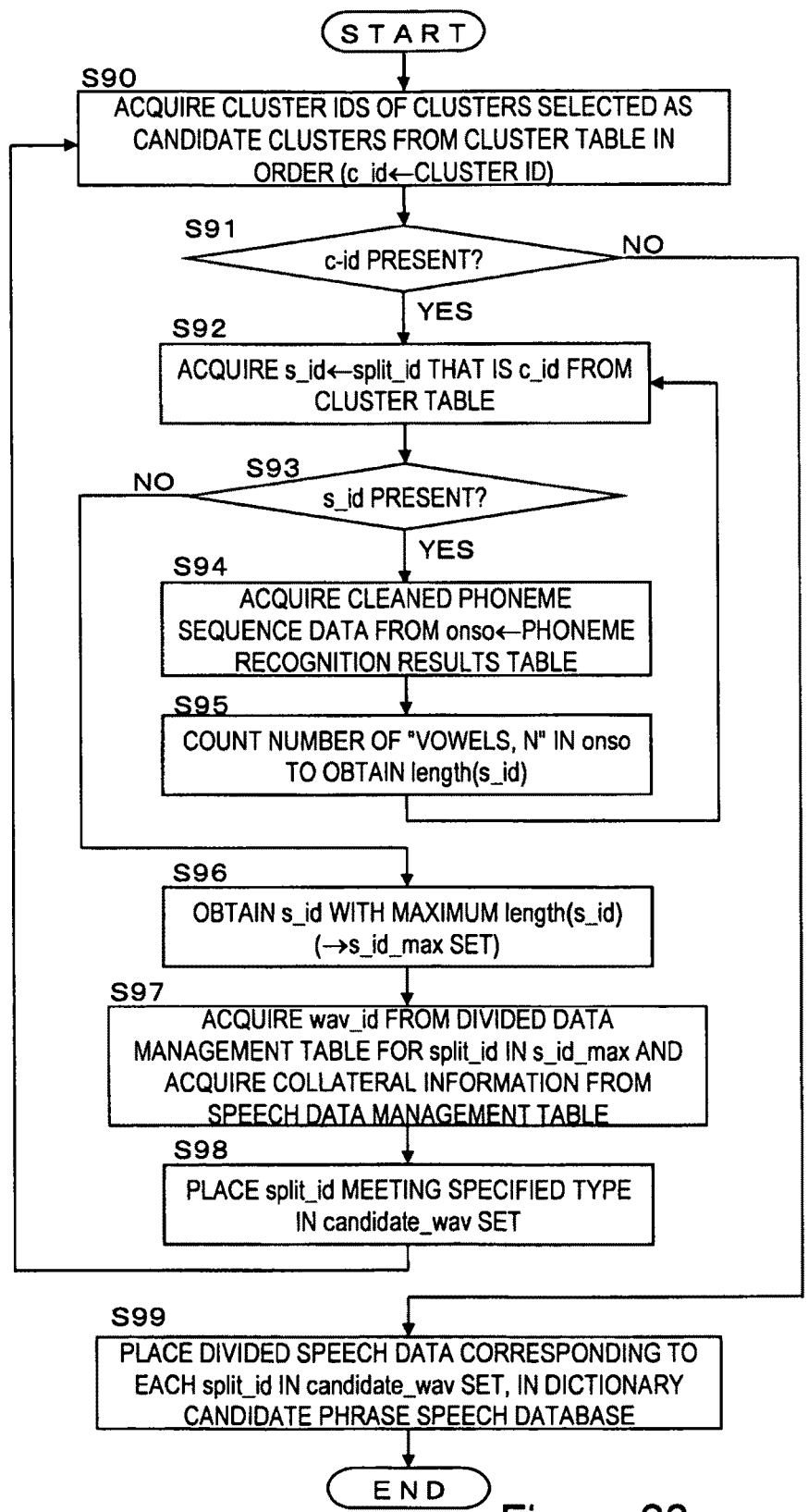
FIG. 22 is a more detailed process flow diagram of a listening target data selecting process (step S9)

FIG. 22 is a more detailed process flow diagram of the listening target data selecting process (step S9).

The listening target data selecting section 18 acquires the cluster ID of the cluster selected as a candidate cluster from the cluster table 104 in order. The listening target data selecting section 18 substitutes the cluster ID into the c_id (step S90).

If there is any unprocessed c-id (YES in step S91), the listening target data selecting section 18 detects the split_id for which the cluster ID in the cluster table 104 is the c_id. The listening target data selecting section 18 then substitutes the split_id into the s_id (step S92).

Moreover, if there is any unprocessed s_id (YES in step S93), the listening target data selecting section 18 acquires the results of cleaning (phoneme sequence data 23') from the phoneme recognition result table 103. The listening target data selecting section 18 then substitutes the results into the onso (step S94). Moreover, the listening target data selecting section 18 counts and determines the number of "noun, N" in the onso to be length (s_id) (step S95). The listening target data selecting section 18 returns to the processing in step S92.

In step S93, if there is no unprocessed s_id (NO in step S93), the listening target data selecting section 18 obtains and places s_id with the maximum length (s_id) in an s_id_max set (step S96). In this case, the listening target data selecting section 18 may obtain a plurality of s_id.

Then, the listening target data selecting section 18 acquires wav_id for the split_id in the s_id_max set from the divided data management table 102 (step S97). The listening target data selecting section 18 acquires the collateral information from the speech data management table 100 (step S97). The listening target data selecting section 18 places the split_id matching the specified type 110 in a candidate_wav set (step S98). The listening target data selecting section 18 then returns to the processing in step S90.

In the processing in step S91, if there is no unprocessed c_id (NO in step S91), the listening target data selecting section 18 stores the divided speech data 22 corresponding to each split_id in the candidate_wav set, in the dictionary candidate phrase speech database 25 (step S99).

In this manner, the speech recognition dictionary creating support device 1 can automatically extract speech data as a candidate for a keyword to be registered in the speech recognition dictionary 26 to support a speech recognition dictionary creating process.

If the speech recognition dictionary creating support device 1 is applied to the support of creation of a speech recognition dictionary 26 for call center operations, a set X (elements x) of all the operations in the call center is set. An unprocessed operation (x) is selected from the set X, and listening target data corresponding to operation (x) is selected. Specifically, the processing in steps S6 to S9 is executed on the phoneme sequence data 23' corresponding to operation (x) among the phoneme sequence data 23' subjected to the phoneme sequence cleaning process in step S5 of the process flow in FIG. 2. This allows listening target data for each operation to be output.

Figure 23:
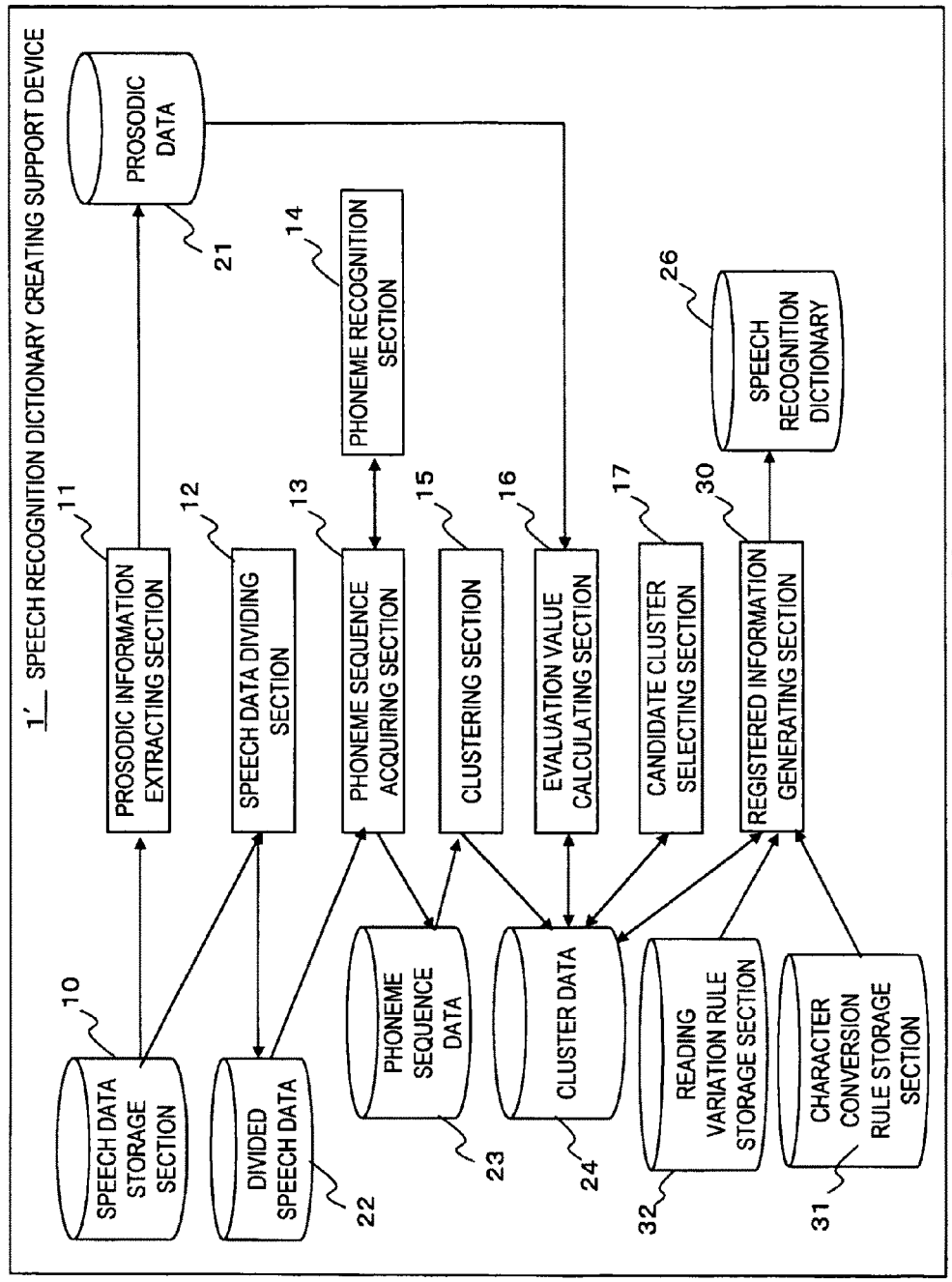
FIG. 23 is a diagram illustrating an example of the configuration of a speech recognition dictionary creating support device according to another embodiment of the present invention.

FIG. 23 is a diagram illustrating an example of the configuration of another embodiment of the present invention.

The configuration of a speech recognition dictionary creating support device 1' in FIG. 23 is almost similar to that of the speech recognition dictionary creating support device 1 in FIG. 1. However, the speech recognition dictionary creating support device 1' includes a registered information generating section 30, a character conversion rule storage section 31, and a reading variation rule storage section 32, instead of the listening target data selecting section 18.

The registered information generating section 30 refers to the character conversion rule storage section 31 and the reading variation rule storage section 32 then converts the phonemes in the representative phoneme sequence into a character string. Based on the converted character string, the registered information generating section 30 generates registration data on a notation or a reading expressing the representative phoneme sequence. The registered information generating section 30 registers the registration data in the speech recognition dictionary 26.

The character conversion rule storage section 31 is configured to store character conversion rules that are rules for the correspondences between the phonemes and the reading characters.

The reading variation rule storage section 32 is configured to store variations of reading character strings for the phonemes.

Figure 24:
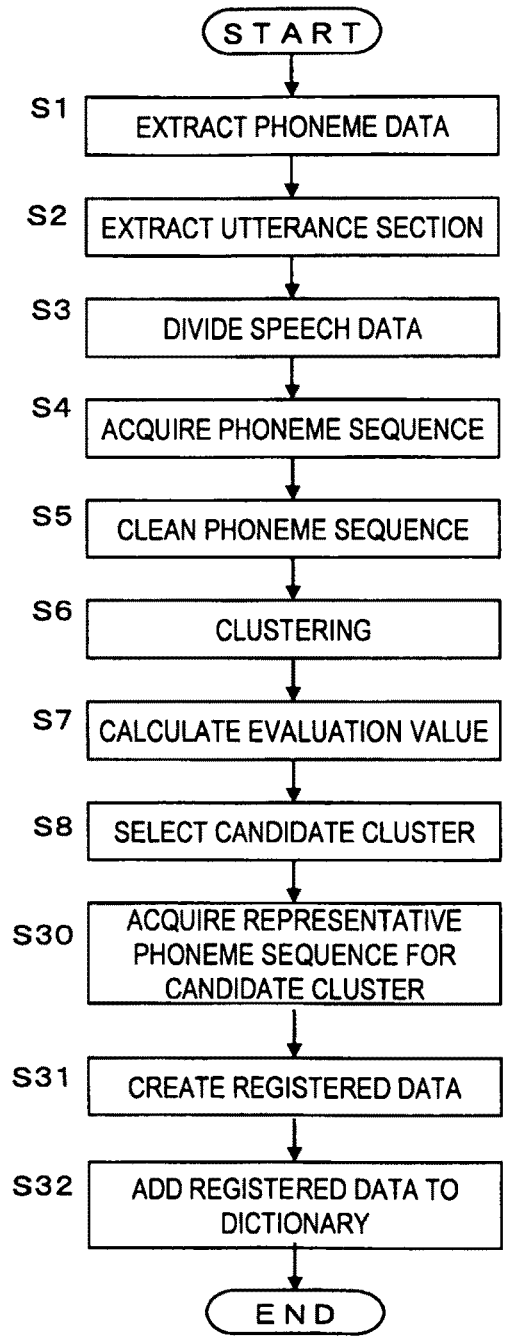
FIG. 24 is a diagram schematically illustrating processing executed by a speech recognition dictionary creating support device according to the embodiment illustrated in FIG. 23.

FIG. 24 is a diagram schematically illustrating processing executed by the speech recognition dictionary creating support device P.

Process steps S1 to S8 in FIG. 24 are the same as the process steps with the same reference numerals illustrated in FIG. 2. After the processing in step S8, steps S30 to S32 are executed.

Step S30: Acquisition of a Representative Phoneme Sequence

The registered information generating section 30 acquires phoneme sequence data 23' corresponding to a representative phoneme sequence, from a candidate cluster in a cluster table 104 which has a flag (○) set therefor.

Step S31: Creation of Registration Data

Figure 25:
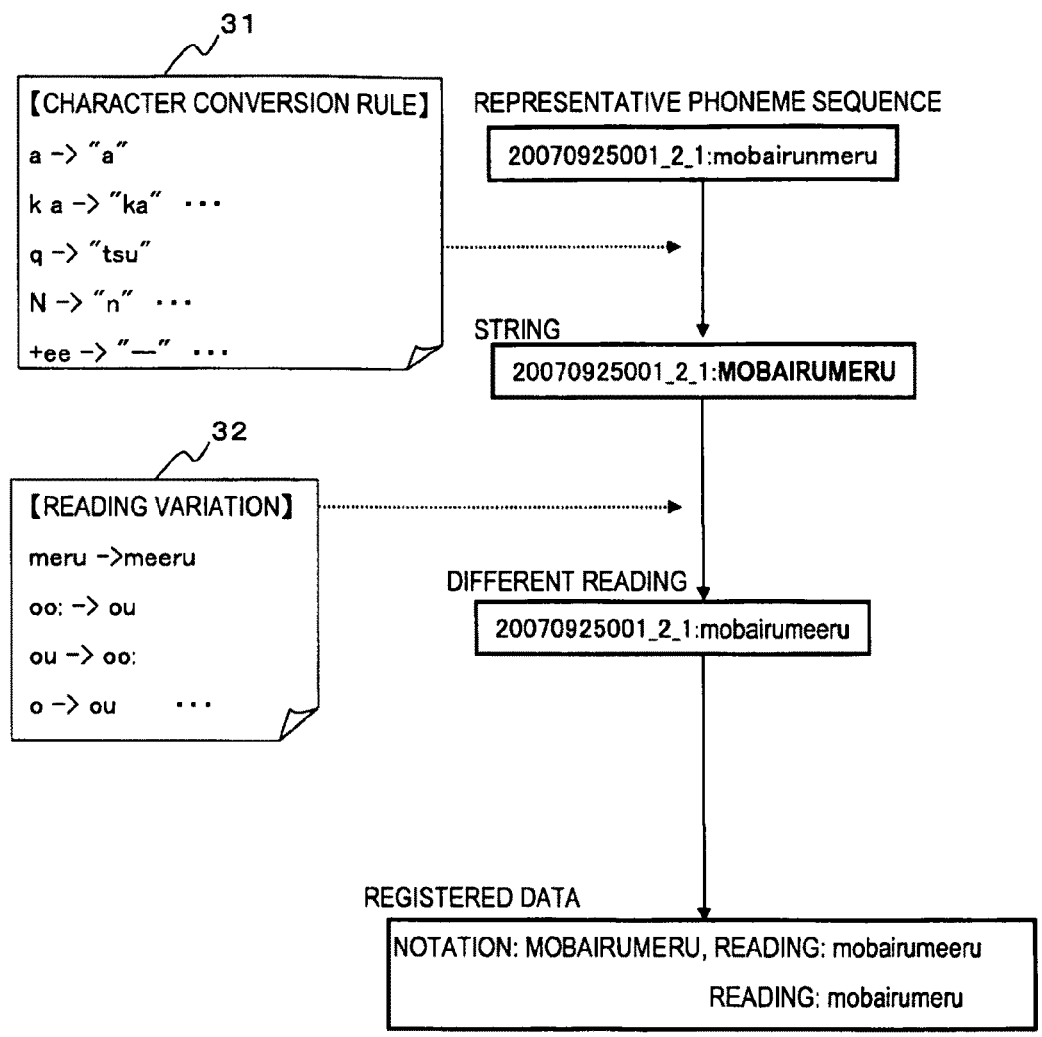
FIG. 25 is a diagram illustrating a registration data generation.

As illustrated in FIG. 25, the registered information generating section 30 refers to the character conversion rule storage section 31 and generates a character string corresponding to the phoneme sequence in the phoneme sequence data 23' in the representative phoneme sequence. The generated character string corresponds to a notation and a reading for the divided speech data 22 corresponding to the representative phoneme sequence.

Moreover, the registered information generating section 30 refers to the reading variation rule storage section 32, and if there is any different reading, the registered information generating section 30 generates a different reading character string.

The registered information generating section 30 determines a pair of the generated character string of the notation and one or more reading character strings to be registration data.

For example, if the character string "mobairumeru" corresponding to the phoneme sequence "mobairunmeru" in the phoneme sequence data 23' in the representative phoneme sequence, the registered information generating section 30 determines the notation and reading of the divided speech data 22 corresponding to the representative phoneme sequence to be "mobairumeru". Moreover, if the reading "mobairumeru" includes another reading variation, the registered information generating section 30 generates a different reading character string "mobairumeeru".

The registered information generating section 30 determines the pair of the notation "mobairumeru" and the readings "mobairumeru and mobairumeeru" to be registration data.

Step S32: Addition to a Dictionary

The registered information generating section 30 registers the generated registration data in the speech recognition dictionary 26.

Figure 26:
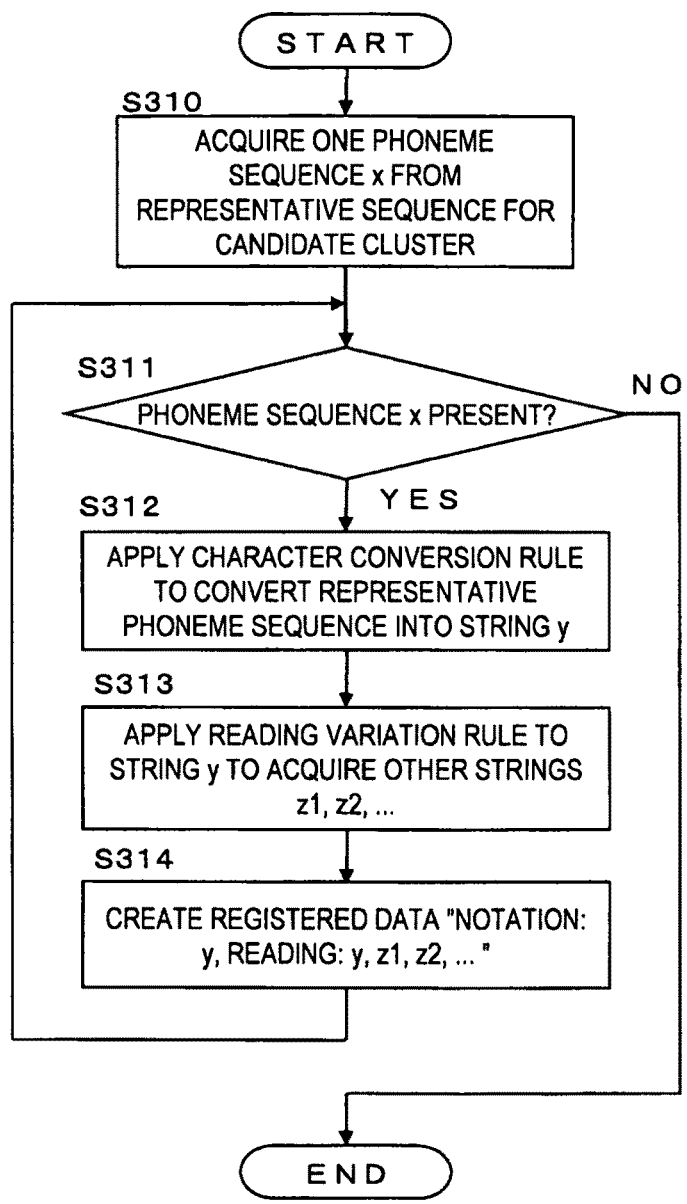
FIG. 26 is a diagram illustrating a more detailed process flow of a registration data generating process (step S31).

FIG. 26 is a diagram illustrating a more detail process flow of the registration data generating process in step S31.

The registered information generating section 30 acquires one phoneme sequence (x) from the phoneme sequence data 23' that is a representative phoneme sequence of a candidate cluster (step S310). If the phoneme sequence (x) is present (YES in step S311), the registered information generating section 30 applies the character conversion rules in the character conversion rule storage section 31 to convert the representative phoneme string into a character string (y) (step S312).

Moreover, the registered information generating section 30 applies the reading variation rules in the reading variation rule storage section 32 to the character string (y) to acquire other strings z1, z2, . . . (step S313).

The registered information generating section 30 generates registration data including "notation=character string (y), reading=character string (y), character string z1, character string z2, . . . ".

The generated registration data is registered in the speech recognition dictionary 26.

Thus, the speech recognition dictionary creating support device 1' automatically generates information on a keyword extracted from the speech data 20, the information being registered in the speech recognition dictionary 26.

All examples and conditional language recited herein are intended for pedagogical purposes to aid the reader in understanding the invention and the concepts contributed by the inventor to furthering the art, and to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A speech recognition dictionary creating support device comprising:
   a speech data storage section storing speech data;
   a prosodic information extracting section extracting prosodic information including at least a speech power value from the speech data;
   a speech data dividing section extracting an utterance section having a period with a power value equal to or larger than a predetermined threshold value lasting a preset time or longer from the speech data based on the prosodic information, and dividing the utterance section into sections, each of which has a power value equal to or lamer than a predetermined threshold value continuing for a given time or longer, to generate divided speech data;
   a phoneme sequence acquiring section executing a phoneme recognition process on the divided speech data to acquire phoneme sequence data for each divided speech data;
   a clustering section executing a clustering process on the phoneme sequence data to generate clusters each of which is a set of classified phoneme sequence data;
   an evaluation value calculating section calculating an evaluation value for each of the clusters based on the prosodic information for the divided speech data corresponding to the phoneme sequence data constituting the cluster;

a candidate cluster selecting section selecting clusters for which the evaluation value is equal to or larger than a given value, as candidate clusters; and a listening target data selecting section determining one of the phoneme sequence data from the phoneme sequence data constituting the cluster for each of the candidate clusters to be a representative phoneme sequence and selecting the divided speech data corresponding to the representative phoneme sequence, as listening target speech data, and wherein the evaluation value calculating section includes dictionary data for a morpheme analysis process, and extracts a phrase classified as a predetermined word class from the dictionary data, calculates an appearance probability, in the extracted phrase, of a common phoneme subsequence constituting in the cluster, and calculates the evaluation value for the cluster based on the appearance probability.

2. The speech recognition dictionary creating support device according to claim 1, wherein the evaluation value calculating section calculates the evaluation value for the cluster based on a number of phoneme sequence data for which the power value in the prosodic information in the divided speech data corresponding to the phoneme sequence data is equal to or larger than a given value.

3. The speech recognition dictionary creating support device according to claim 1, wherein the prosodic information extracting section extracts prosodic information including a speech pitch value as the prosodic information, and the evaluation value calculating section calculates the evaluation value for the cluster based on the number of phoneme sequence data for which the pitch value in the prosodic information in the divided speech data corresponding to the phoneme sequence data has a range equal to or larger than a given value.

4. The speech recognition dictionary creating support device according to claim 1, wherein the evaluation value calculating section calculates an appearance frequency of each phoneme sequence data in all the divided speech data, and calculates the evaluation value for the cluster based on the appearance frequency.

5. The speech recognition dictionary creating support device according to claim 1, wherein the listening target data selecting section determines phoneme sequence data with a longest phoneme sequence in the candidate cluster to be the representative phoneme sequence.

6. The speech recognition dictionary creating support device according to claim 1, wherein the listening target data selecting section determines phoneme sequence data with a largest number of corresponding divided phoneme data in the candidate cluster to be the representative phoneme sequence.

7. The speech recognition dictionary creating support device according to claim 1, wherein the listening target data selecting section comprises dictionary data for a morpheme analysis process, and extracts a phrase classified as a predetermined word class from the dictionary data, calculates the appearance probability, in the extracted phrase, of the phoneme sequence data constituting the candidate cluster, and determines the phoneme sequence data with a highest appearance probability to be the representative phoneme sequence.

8. The speech recognition dictionary creating support device according to claim 1, wherein the listening target data selecting section selects divided speech data with the largest speech power value from the divided speech data corresponding to the representative phoneme sequence.

9. The speech recognition dictionary creating support device according to claim 1, wherein the listening target data selecting section selects divided speech data with a largest speech pitch range from the divided speech data corresponding to the representative phoneme sequence.

10. The speech recognition dictionary creating support device according to claim 1, further comprising collateral information storage section storing collateral information associated with an attribute of the speech data, and wherein the listening target data selecting section acquires an externally input specified condition specifying the attribute of the speech data, and references the collateral information to select divided speech data with an attribute matching the specified condition from the divided speech data corresponding to the representative phoneme sequence.

11. The speech recognition dictionary creating support device according to claim 1, further comprising:

a character conversion rule storage section storing a character conversion rule indicative of a rule for conversion of a phoneme character; and a registration data generating section converting each phoneme of the representative phoneme sequence into a character based on the character conversion rule to generate a character string, thus generating registration data for a speech recognition dictionary which is expressed by or read as the character string.

12. A non-transitory computer-readable medium storing a speech recognition dictionary creating support processing program causing a computer to function as a processing device comprising:

storing speech data;

extracting prosodic information including at least a speech power value from the speech data;

extracting an utterance section having a period with a power value equal to or larger than a predetermined threshold value lasting a preset time or longer from the speech data based on the prosodic information, and dividing the utterance section into sections, each of which has a power value equal to or larger than a predetermined threshold value continuing for a given time or longer, to generate divided speech data;

executing a phoneme recognition process on the divided speech data to acquire phoneme sequence data for each divided speech data;

executing a clustering process on the phoneme sequence data to generate clusters each of which is a set of classified phoneme sequence data;

calculating an evaluation value for each of the clusters based on the prosodic information for the divided speech data corresponding to the phoneme sequence data constituting the cluster;

selecting clusters for which the evaluation value is equal to or larger than a given value, as candidate clusters; and determining one of the phoneme sequence data from the phoneme sequence data constituting the cluster for each of the candidate clusters to be a representative phoneme sequence, the representative phoneme sequence determined by considering one among a largest sequence length, a largest number of divided speech data corresponding to each phoneme sequence and a word fitness of each phoneme sequence and selecting the divided speech data corresponding to the representative phoneme sequence, as listening target speech data, and wherein the calculating includes dictionary data for a morpheme analysis process, and extracts a phrase classified as a predetermined word class from the dictionary data, calculates an appearance probability, in the extracted phrase, of a common phoneme subsequence constituting in the cluster, and calculates the evaluation value for the cluster based on the appearance probability.

13. The non-transitory computer-readable medium according to claim 12, wherein a word fitness determines the representative phoneme sequence by a largest value identified in a comparison of the clusters.

14. A processing method executed by a computer comprising a speech data storage section configured to store speech data, the method comprising:

extracting prosodic information including at least a speech power value from the speech data stored in the speech data storage section;
  extracting an utterance section having a period with a power value equal to or larger than a predetermined threshold value lasting a preset time or longer from the speech data based on the prosodic information, and dividing the utterance section into sections, each of which has a power value equal to or larger than a predetermined threshold value continuing for a given time or longer, to generate divided speech data;
  executing a phoneme recognition process on the divided speech data to acquire phoneme sequence data for each divided speech data;
  executing a clustering process on the phoneme sequence data to generate clusters each of which is a set of classified phoneme sequence data;
  calculating an evaluation value for each of the clusters based on the prosodic information for the divided speech data corresponding to the phoneme sequence data constituting the cluster;
  selecting clusters for which the evaluation value is equal to or larger than a given value, as candidate clusters; and
  determining one of the phoneme sequence data from the phoneme sequence data constituting the cluster for each of the candidate clusters to be a representative phoneme sequence, the representative phoneme sequence determined by considering one among a largest sequence length, a largest number of divided speech data corresponding to each phoneme sequence and a word fitness of each phoneme sequence and selecting the divided speech data corresponding to the representative phoneme sequence, as listening target speech data, and
  wherein the calculating includes dictionary data for a morpheme analysis process, and extracts a phrase classified as a predetermined word class from the dictionary data, calculates an appearance probability, in the extracted phrase, of a common phoneme subsequence constituting in the cluster, and calculates the evaluation value for the cluster based on the appearance probability.

15. The processing method according to claim 14, wherein a word fitness determines the representative phoneme sequence by a largest value identified in a comparison of the clusters.

16. A speech recognition dictionary creating support device comprising:

a speech data storage section storing speech data;
  a prosodic information extracting section extracting prosodic information including at least a speech power value from the speech data;
  a speech data dividing section extracting an utterance section having a period with a power value equal to or larger than a predetermined threshold value lasting a preset time or longer from the speech data based on the prosodic information, and dividing the utterance section into sections, each of which has a power value equal to or larger than a predetermined threshold value continuing for a given time or longer, to generate divided speech data;
  a phoneme sequence acquiring section executing a phoneme recognition process on the divided speech data to acquire phoneme sequence data for each divided speech data;
  a clustering section executing a clustering process on the phoneme sequence data to generate clusters each of which is a set of classified phoneme sequence data;
  an evaluation value calculating section calculating an evaluation value for each of the clusters based on the prosodic information for the divided speech data corresponding to the phoneme sequence data constituting the cluster;
  a candidate cluster selecting section selecting clusters for which the evaluation value is equal to or larger than a given value, as candidate clusters; and
  a listening target data selecting section determining one of the phoneme sequence data from the phoneme sequence data constituting the cluster for each of the candidate clusters to be a representative phoneme sequence, the representative phoneme sequence determined by considering one among a largest sequence length, a largest number of divided speech data corresponding to each phoneme sequence and a word fitness of each phoneme sequence and selecting the divided speech data corresponding to the representative phoneme sequence, as listening target speech data, and
  wherein the calculating includes dictionary data for a morpheme analysis process, and extracts a phrase classified as a predetermined word class from the dictionary data, calculates an appearance probability, in the extracted phrase, of a common phoneme subsequence constituting in the cluster, and calculates the evaluation value for the cluster based on the appearance probability.

* * * * *

UNITED STATES PATENT AND TRADEMARK OFFICE
CERTIFICATE OF CORRECTION

| | | |
|---|---|---|
| PATENT NO. | : 8,423,354 B2 | |
| APPLICATION NO. | : 12/926281 | |
| DATED | : April 16, 2013 | |
| INVENTOR(S) | : Sachiko Onodera | |

It is certified that error appears in the above-identified patent and that said Letters Patent is hereby corrected as shown below:

In the Claims

Column 16, Line 56, In Claim 1, delete "lamer" and insert -- larger --, therefor.

Signed and Sealed this
Twenty-fourth Day of September, 2013

Teresa Stanek Rea
*Deputy Director of the United States Patent and Trademark Office*